(12) United States Patent
Kim et al.

(10) Patent No.: US 12,554,359 B2
(45) Date of Patent: Feb. 17, 2026

(54) TOUCH MODULE AND ELECTRONIC DEVICE INCLUDING THE SAME

(71) Applicant: Samsung Display Co., LTD., Yongin-si (KR)

(72) Inventors: Jang Hui Kim, Yongin-si (KR); Ji Hoon Kim, Yongin-si (KR); Keum Dong Jung, Yongin-si (KR)

(73) Assignee: Samsung Display Co., Ltd., Yongin-si (KR)

( * ) Notice: Subject to any disclaimer, the term of this patent is extended or adjusted under 35 U.S.C. 154(b) by 0 days.

(21) Appl. No.: 18/585,956

(22) Filed: Feb. 23, 2024

(65) Prior Publication Data

US 2025/0077021 A1 Mar. 6, 2025

(30) Foreign Application Priority Data

Sep. 4, 2023 (KR) .................. 10-2023-0116965

(51) Int. Cl.
*G06F 3/041* (2006.01)
*G06F 3/044* (2006.01)

(52) U.S. Cl.
CPC ........ *G06F 3/04166* (2019.05); *G06F 3/0441* (2019.05)

(58) Field of Classification Search
CPC .................. G06F 3/04166; G06F 3/0441
See application file for complete search history.

(56) References Cited

U.S. PATENT DOCUMENTS

| | | | |
|---|---|---|---|
| 2018/0143726 A1* | 5/2018 | Reynolds | G02F 1/13338 |
| 2019/0114018 A1* | 4/2019 | Maguire | G06F 3/0412 |
| 2019/0179475 A1* | 6/2019 | Seo | G06F 3/0442 |
| 2020/0278765 A1* | 9/2020 | Chen | G06F 3/047 |
| 2022/0187938 A1* | 6/2022 | Han | G06F 3/0446 |

* cited by examiner

*Primary Examiner* — Towfiq Elahi
(74) *Attorney, Agent, or Firm* — Womble Bond Dickinson (US) LLP

(57) ABSTRACT

A touch module includes: a touch array including: a first electrode group including touch electrodes extending in a first direction, and located along a second direction crossing the first direction; and a second electrode group including touch electrodes extending in the second direction, and located along the first direction; and a touch driver to output uplink signals through each of the first electrode group and the second electrode group to an external device adjacent to the touch array, the external device to calculate position information based on the uplink signals. The touch driver is to output the uplink signals by applying touch driving signals to some of the touch electrodes of the first touch electrode group, and at least one synchronization signal to others of the touch electrodes of the first touch electrode group, and at least some of the touch driving signals are synchronized with the synchronization signal.

11 Claims, 18 Drawing Sheets

TOUCH MODULE AND ELECTRONIC DEVICE INCLUDING THE SAME

CROSS-REFERENCE TO RELATED APPLICATION

The present application claims priority to and the benefit of Korean Patent Application No. 10-2023-0116965, filed on Sep. 4, 2023, in the Korean Intellectual Property Office, the entire disclosure of which is incorporated by reference herein.

BACKGROUND

1. Field

Aspects of embodiments of the present disclosure relate to an electronic device for supporting a touch function.

2. Description of the Related Art

Touch devices having a function for indicating a position by a touch are widely used. For example, with the wide spread of mobile electronic devices, such as smartphones and tablet computers, touch devices have been widely used. Recently, there is an increasing demand for technology that recognizes a touch on a touch array by using not only fingers, but also by using other tools such as an active pen.

However, electronic devices may have considerable difficulty in efficiently providing both the touch of a finger and the touch of an active pen, while basically providing a display function. For example, as displays in electronic devices tend to become larger and faster, the sensing performance for recognizing a touch on a touch array may deteriorate, which may cause a decrease in the reliability of the operations of touch devices, display devices, and electronic devices.

The above information disclosed in this Background section is for enhancement of understanding of the background of the present disclosure, and therefore, it may contain information that does not constitute prior art.

SUMMARY

Embodiments of the present disclosure are directed to a touch module (e.g., a touch device, a touch panel, or a touch layer) capable of recognizing a touch with improved reliability, and an electronic device including the same.

According to one or more embodiments of the present disclosure, a touch module includes: a touch array including: a first touch electrode group including touch electrodes extending in a first direction, and located along a second direction crossing the first direction; and a second touch electrode group including touch electrodes extending in the second direction, and located along the first direction; and a touch driver configured to output uplink signals through each of the first touch electrode group and the second touch electrode group to an external device adjacent to the touch array, the external device being configured to calculate position information based on the uplink signals. The touch driver is configured to output the uplink signals by applying touch driving signals to some of the touch electrodes of the first touch electrode group, and by applying at least one synchronization signal to others of the touch electrodes of the first touch electrode group, and at least some of the touch driving signals are synchronized with the at least one synchronization signal.

In an embodiment, the touch driver may be configured to apply the touch driving signals to first touch electrodes from among the touch electrodes of the first touch electrode group, and apply the at least one synchronization signal to a second touch electrode adjacent to the first touch electrodes from among the touch electrodes of the first touch electrode group, and the touch driver may be configured to apply the touch driving signals and the at least one synchronization signal concurrently with each other.

In an embodiment, the at least one synchronization signal may include a first synchronization signal and a second synchronization signal. The touch driver may be configured to apply the touch driving signals to first touch electrodes from among the touch electrodes of the first touch electrode group, and apply the first synchronization signal and the second synchronization signal to a second touch electrode and a third touch electrode adjacent to the first touch electrodes from among the touch electrodes of the first touch electrode group, and the first touch electrodes may be located between the second touch electrode and the third touch electrode.

In an embodiment, the touch electrodes of the first touch electrode group may be grouped into sub-touch electrode groups, and the touch driver may be configured to apply the touch driving signals and the at least one synchronization signal to each of the sub-touch electrode groups.

In an embodiment, the touch driving signals may include first to m-th touch driving signals, and the at least one synchronization signal may include a first synchronization signal. The touch electrodes of the first touch electrode group may include first to m+1-th touch electrodes sequentially located along the second direction. The touch driver may be configured to apply the first to m-th touch driving signals to the first to m-th touch electrodes from among the touch electrodes of the first touch electrode group, and apply the first synchronization signal to the m+1-th touch electrode. Here, m may be an integer greater than 1.

In an embodiment, the at least one synchronization signal may further include a second synchronization signal, the touch electrodes of the first touch electrode group may further include a zeroth touch electrode adjacent to the first touch electrode in a direction opposite to the second direction, and the touch driver may be configured to apply the second synchronization signal to the zeroth touch electrode.

In an embodiment, the touch driving signals may include first to m-th touch driving signals, and the touch electrodes of the first touch electrode group may include first to m+1-th touch electrodes sequentially located along the second direction. The touch driver may be configured to apply the first to m-th touch driving signals to the first to m-th touch electrodes from among the touch electrodes of the first touch electrode group, and apply the at least one synchronization signal to the m+1-th touch electrode, in a first time interval. Here, m may be an integer greater than 1.

In an embodiment, the touch driver may be configured to apply the first to m-th touch driving signals to second to m+1-th touch electrodes from among the touch electrodes of the first touch electrode group, and apply the at least one synchronization signal to the first touch electrode, in a second time interval.

In an embodiment, the at least one synchronization signal may include a pulse signal having a constant period.

In an embodiment, the touch driving signals may include different codes from each other, and the codes may be orthogonal to each other.

In an embodiment, the touch driver may be configured to output the uplink signals by applying the touch driving signals to some of the touch electrodes of the second touch electrode group, and by applying the at least one synchronization signal to others of the touch electrodes of the second touch electrode group. At least some of the touch driving signals may be synchronized with the at least one synchronization signal.

In an embodiment, the touch driver may be configured to apply the touch driving signals to first touch electrodes from among the touch electrodes of the second touch electrode group, and apply the at least one synchronization signal to a second touch electrode adjacent to the first touch electrodes from among the touch electrodes of the second touch electrode group. The touch driver may be configured to apply the touch driving signals and the at least one synchronization signal concurrently with each other.

In an embodiment, the at least one synchronization signal may include a first synchronization signal and a second synchronization signal. The touch driver may be configured to apply the touch driving signals to first touch electrodes from among the touch electrodes of the second touch electrode group, and apply the first synchronization signal and the second synchronization signal to a second touch electrode and a third touch electrode adjacent to the first touch electrodes from among the touch electrodes of the second touch electrode group. The first touch electrodes may be located between the second touch electrode and the third touch electrode.

In an embodiment, the touch electrodes of the second touch electrode group may be grouped into sub-touch electrode groups, and the touch driver may be configured to apply the touch driving signals and the at least one synchronization signal to each of the sub-touch electrode groups.

In an embodiment, the touch driving signals may include first to n-th touch driving signals, and the touch electrodes of the second touch electrode group may include first to n+1-th touch electrodes sequentially located along the first direction. The touch driver may be configured to apply the first to n-th touch driving signals to first to n-th touch electrodes from among the touch electrodes of the second touch electrode group, and apply the at least one synchronization signal to the n+1-th touch electrode, in a third time interval. Here, n may be an integer greater than 1.

In an embodiment, the touch driver may be configured to apply the first to n-th touch driving signals to second to n+1-th touch electrodes from among the touch electrodes of the second touch electrode group, and apply the at least one synchronization signal to the first touch electrode, in a fourth time interval.

According to one or more embodiments of the present disclosure, an electronic device includes: a touch array including: a first touch electrode group including touch electrodes extending in a first direction, and located along a second direction crossing the first direction; and a second touch electrode group including touch electrodes extending in the second direction, and located along the first direction; a touch driver configured to output uplink signals through each of the first touch electrode group and the second touch electrode group; and a host configured to receive position information, which is calculated based on the uplink signals, from an external device adjacent to the touch array and configured to receive the uplink signals. The touch driver is configured to output the uplink signals by applying touch driving signals to some of the touch electrodes of the first touch electrode group, and by applying at least one synchronization signal to others of the touch electrodes of the first touch electrode group, and at least some of the touch driving signals are synchronized with the at least one synchronization signal.

BRIEF DESCRIPTION OF THE DRAWINGS

The above and other aspects and features of the present disclosure will be more clearly understood from the following detailed description of the illustrative, non-limiting embodiments with reference to the accompanying drawings.

DETAILED DESCRIPTION

Figure 1:
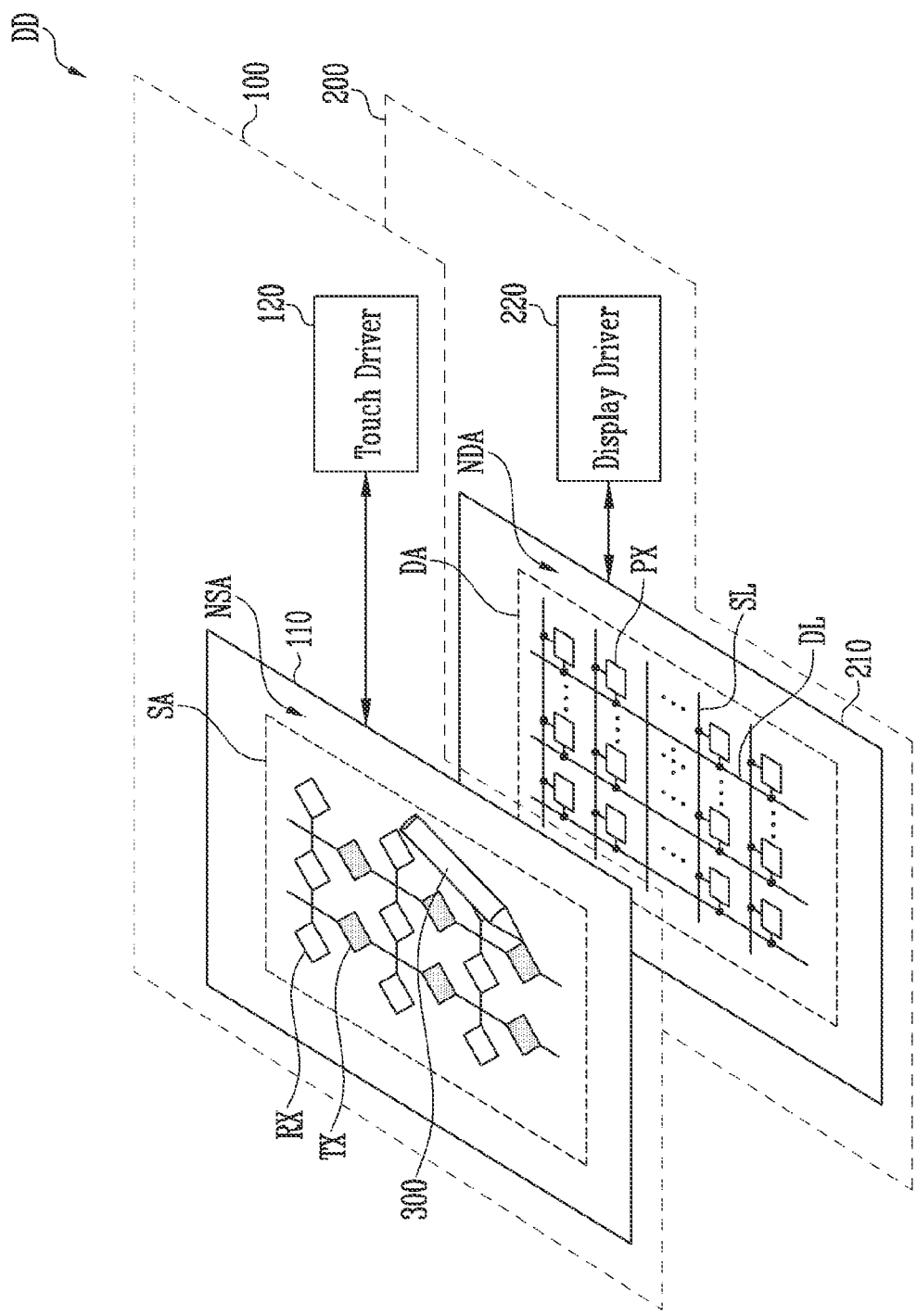
FIG. 1 is a block diagram illustrating a display device including a touch module in accordance with an embodiment of the present disclosure.

Hereinafter, embodiments will be described in more detail with reference to the accompanying drawings, in which like reference numbers refer to like elements throughout. The present disclosure, however, may be embodied in various different forms, and should not be construed as being limited to only the illustrated embodiments herein. Rather, these embodiments are provided as examples so that this disclosure will be thorough and complete, and will fully convey the aspects and features of the present disclosure to those skilled in the art. Accordingly, processes, elements, and techniques that are not necessary to those having ordinary skill in the art for a complete understanding of the aspects and features of the present disclosure may not be described. Unless otherwise noted, like reference numerals denote like elements throughout the attached drawings and the written description, and thus, redundant description thereof may not be repeated.

When a certain embodiment may be implemented differently, a specific process order may be different from the described order. For example, two consecutively described processes may be performed at the same or substantially at the same time, or may be performed in an order opposite to the described order.

In the drawings, the relative sizes, thicknesses, and ratios of elements, layers, and regions may be exaggerated and/or simplified for clarity. Spatially relative terms, such as "beneath," "below," "lower," "under," "above," "upper," and the like, may be used herein for ease of explanation to describe one element or feature's relationship to another element(s) or feature(s) as illustrated in the figures. It will be understood that the spatially relative terms are intended to encompass different orientations of the device in use or in operation, in addition to the orientation depicted in the figures. For example, if the device in the figures is turned over, elements described as "below" or "beneath" or "under" other elements or features would then be oriented "above" the other elements or features. Thus, the example terms "below" and "under" can encompass both an orientation of above and below. The device may be otherwise oriented (e.g., rotated 90 degrees or at other orientations) and the spatially relative descriptors used herein should be interpreted accordingly.

In the figures, the x-axis, the y-axis, and the z-axis are not limited to three axes of the rectangular coordinate system, and may be interpreted in a broader sense. For example, the x-axis, the y-axis, and the z-axis may be perpendicular to or substantially perpendicular to one another, or may represent different directions from each other that are not perpendicular to one another.

It will be understood that, although the terms "first," "second," "third," etc., may be used herein to describe various elements, components, regions, layers and/or sections, these elements, components, regions, layers and/or sections should not be limited by these terms. These terms are used to distinguish one element, component, region, layer or section from another element, component, region, layer or section. Thus, a first element, component, region, layer or section described below could be termed a second element, component, region, layer or section, without departing from the spirit and scope of the present disclosure.

It will be understood that when an element or layer is referred to as being "on," "connected to," or "coupled to" another element or layer, it can be directly on, connected to, or coupled to the other element or layer, or one or more intervening elements or layers may be present. Similarly, when a layer, an area, or an element is referred to as being "electrically connected" to another layer, area, or element, it may be directly electrically connected to the other layer, area, or element, and/or may be indirectly electrically connected with one or more intervening layers, areas, or elements therebetween. In addition, it will also be understood that when an element or layer is referred to as being "between" two elements or layers, it can be the only element or layer between the two elements or layers, or one or more intervening elements or layers may also be present.

The terminology used herein is for the purpose of describing particular embodiments and is not intended to be limiting of the present disclosure. As used herein, the singular forms "a" and "an" are intended to include the plural forms as well, unless the context clearly indicates otherwise. It will be further understood that the terms "comprises," "comprising," "includes," "including," "has," "have," and "having," when used in this specification, specify the presence of the stated features, integers, steps, operations, elements, and/or components, but do not preclude the presence or addition of one or more other features, integers, steps, operations, elements, components, and/or groups thereof. As used herein, the term "and/or" includes any and all combinations of one or more of the associated listed items. For example, the expression "A and/or B" denotes A, B, or A and B.

Expressions such as "at least one of," when preceding a list of elements, modify the entire list of elements and do not modify the individual elements of the list. For example, the expression "at least one of a, b, or c," "at least one of a, b, and c," and "at least one selected from the group consisting of a, b, and c" indicates only a, only b, only c, both a and b, both a and c, both b and c, all of a, b, and c, or variations thereof.

As used herein, the term "substantially," "about," and similar terms are used as terms of approximation and not as terms of degree, and are intended to account for the inherent variations in measured or calculated values that would be recognized by those of ordinary skill in the art. Further, the use of "may" when describing embodiments of the present disclosure refers to "one or more embodiments of the present disclosure." As used herein, the terms "use," "using," and "used" may be considered synonymous with the terms "utilize," "utilizing," and "utilized," respectively.

Unless otherwise defined, all terms (including technical and scientific terms) used herein have the same meaning as commonly understood by one of ordinary skill in the art to which the present disclosure belongs. It will be further understood that terms, such as those defined in commonly used dictionaries, should be interpreted as having a meaning that is consistent with their meaning in the context of the relevant art and/or the present specification, and should not be interpreted in an idealized or overly formal sense, unless expressly so defined herein.

FIG. 1 is a block diagram illustrating a display device including a touch module in accordance with an embodiment of the present disclosure.

Referring to FIG. 1, a display device DD may include a touch module (e.g., a touch device, a touch panel, or a touch layer) 100 and a display module (e.g., a display, a display panel, or a display layer) 200.

The touch module 100 may include a touch array 110, and a touch driver 120 for driving the touch array 110. The display module 200 may include a display panel 210, and a display driver 220 for driving the display panel 210.

In one or more embodiments, the touch array 110 and the display panel 210 may be manufactured separately from each other, and then combined to at least partially overlap with each other. In other embodiments, the touch array 110 and the display panel 210 may be manufactured integrally with each other as a single body. In this case, the touch array 110 may be directly formed on at least one layer constituting the display panel 210, for example, such as on an upper substrate, a thin-film encapsulation layer, or an insulating layer of the display panel 210.

FIG. 1 illustrates that the touch array 110 is disposed above the display panel 210, but the present disclosure is not limited thereto. For example, the touch array 110 may be disposed below the display panel 210.

The touch array 110 may include a sensing area SA capable of sensing a touch, and a non-sensing area NSA around (e.g., adjacent to) the sensing area SA. The sensing area SA may at least partially overlap with a display area DA. The display device DD may display an image through the sensing area SA, and may also detect a touch input made on a display surface and/or detect light incident from the front. The non-sensing area NSA may surround (e.g., around a periphery of) the sensing area SA, but the present disclosure is not limited thereto.

The touch array 110 may include a substrate, and driving electrodes TX and sensing electrodes RX formed on the substrate. The driving electrodes TX and the sensing electrodes RX may be disposed in the sensing area SA on the substrate. In one or more embodiments, the substrate may be a rigid substrate including a suitable material, such as glass or tempered glass. In other embodiments, the substrate may be a flexible substrate including a suitable material, such as plastic or a metal. In one or more embodiments, at least one layer constituting the display panel 210 may be used as a substrate for the touch array 110.

The display panel 210 may include the display area DA for displaying an image, and a non-display area NDA around (e.g., adjacent to) the display area DA. The non-display area NDA may at least partially surround (e.g., around a periphery of) the display area DA. The display panel 210 may include pixels PX formed on the substrate. The pixels PX may be disposed in the display area DA. In one or more embodiments, the substrate may be a rigid substrate including a suitable material, such as glass or tempered glass. In other embodiments, the substrate may be a flexible substrate including a suitable material, such as plastic or a metal.

The pixels PX are connected to scan lines SL and data lines DL. The pixels PX are selected by a turn-on level driving signal supplied through the scan lines SL, and receive data signals through the data lines DL. Accordingly, the pixels PX emit light having a desired luminance corresponding to the data signals, and an image is displayed in the display area DA.

Wirings and/or built-in circuits connected to the pixels PX may be disposed in the non-display area NDA. For example, a scan driver may be disposed in the non-display area NDA.

In one or more embodiments, as the pixels PX, the display panel 210 may include organic light-emitting diodes, inorganic light-emitting diodes, quantum dot/well light-emitting diodes, or the like. In other embodiments, the display panel 210 may be implemented as a liquid crystal display panel. In this case, a light source, such as a backlight unit (e.g., a backlight panel or a backlight layer) may be additionally included.

In one or more embodiments, the touch driver 120 and the display driver 220 may include (e.g., may be implemented as) separate integrated chips (ICs) from each other. In other embodiments, the touch driver 120 and the display driver 220 may be mounted together within a single IC.

The display driver 220 may be electrically connected to the display panel 210 to drive the pixels PX. The display driver 220 and the display panel 210 will be described in more detail below with reference to FIG. 2.

The touch driver 120 may be connected to the touch array 110 to drive the touch array 110. The touch array 110 and the touch driver 120 will be described in more detail below with reference to FIG. 4.

The touch driver 120 may transmit uplink signals to an external device by applying touch driving signals and at least one synchronization signal to the touch array 110. In addition, an external device 300 may receive the uplink signals, calculate position information on the touch array 110 based on the uplink signals, and detect the touch of the user.

For example, the display device DD may be employed in various suitable electronic devices, such as computers, laptops, cellular phones, smartphones, personal digital assistants (PDAs), portable multimedia players (PMPs), digital TVs, digital cameras, portable game consoles, navigation devices, wearable devices, internet of things (IoT) devices, internet of everything (IoE) devices, e-books, virtual reality (VR) devices, augmented reality (AR) devices, car navigation systems, video phones, surveillance systems, autofocus systems, tracking systems, motion detection systems, and/or the like.

Figure 2:
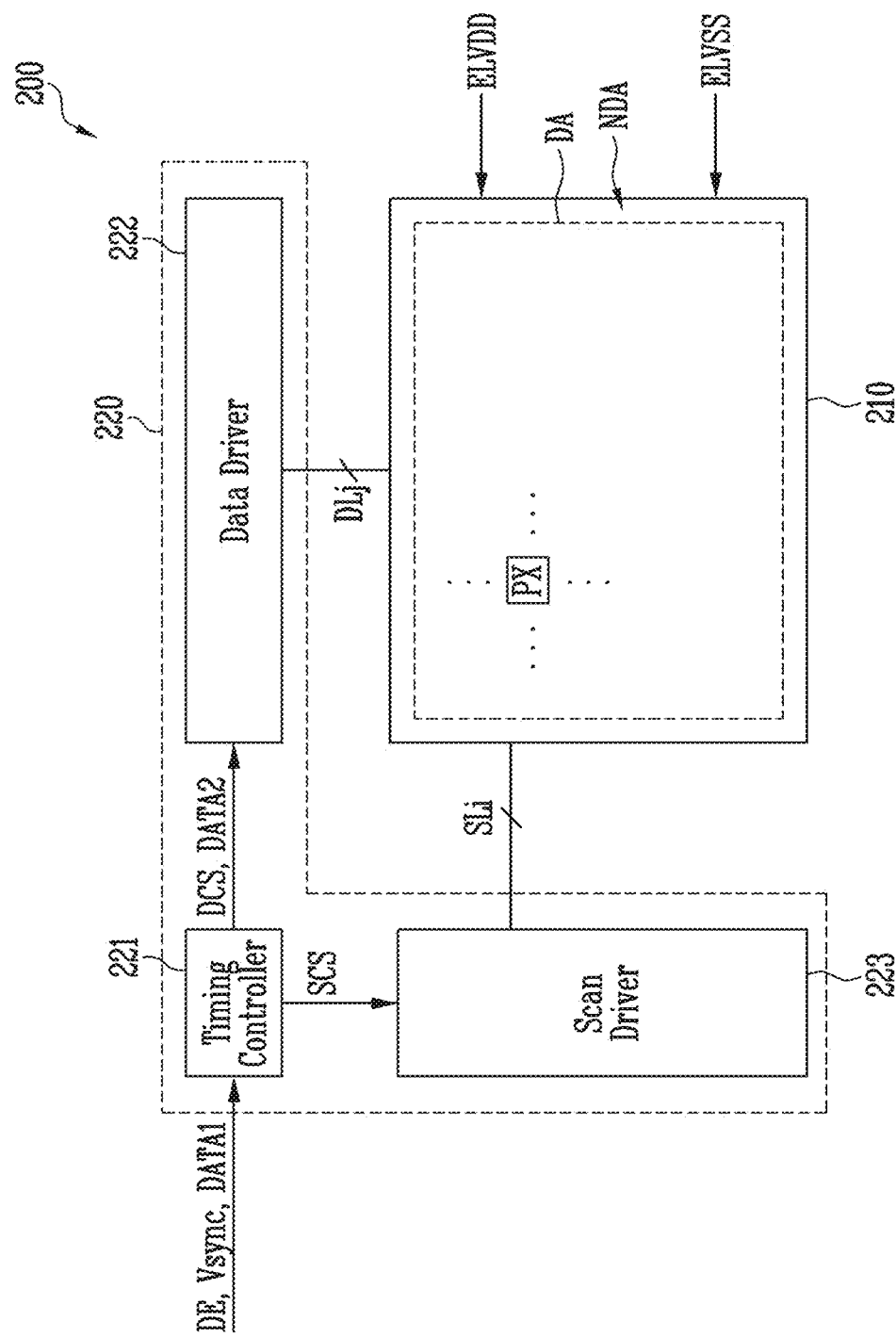
FIG. 2 is a block diagram illustrating an embodiment of the display module of FIG. 1.

FIG. 2 is a block diagram illustrating an embodiment of the display module of FIG. 1.

Referring to FIG. 2, the display module 200 may include a display panel 210 and a display driver 220. The display driver 220 may include a timing controller 221, a data driver 222, and a scan driver 223.

The display module 200 may receive an external input signal from a host. The display module 200 may receive first image data DATA1 as the external input signal. In one or more embodiments, the host may include an application processor, a central processing unit (CPU), or the like, to control the display module 200. In one or more embodiments, the host may include a graphic processing unit (GPU) that controls the display module 200. In addition, the host may include at least one of various suitable devices that provide the first image data DATA1 to the display module 200.

The timing controller 221 may generate control signals for controlling the data driver 222 and the scan driver 123 by using the external input signal. For example, the control signals may include a scan driver control signal SCS for controlling the scan driver 123, and a data driver control signal DCS for controlling the data driver 222. The external input signal may include a data enable signal DE and a vertical synchronization signal Vsync, in addition to a signal containing position information corresponding to the external device 300 on the touch array 110. In more detail, the vertical synchronization signal Vsync may be a signal for synchronizing image data. The vertical synchronization signal Vsync may be a signal inputted at a period of one frame as a signal for distinguishing frames. However, the present disclosure is not limited thereto. For example, the vertical synchronization signal Vsync may be generated internally in the timing controller 221. For example, the timing controller 221 may include a logic circuit that generates the vertical synchronization signal Vsync based on a signal received from the host, such as the data enable signal DE.

In one or more embodiments, the vertical synchronization signal Vsync may be provided to the touch driver 120 of FIG. 1, and the touch driver 120 may generate uplink signals (e.g., see ULS of FIG. 3) in synchronization with the vertical synchronization signal Vsync.

The timing controller 221 may supply the scan driver control signal SCS to the scan driver 223, and may supply the data driver control signal DCS to the data driver 222. In addition, the timing controller 221 may convert the first image data DATA1 inputted from the outside into second image data DATA2 that satisfies specifications of the data driver 222, and may supply the second image data DATA2 to the data driver 222.

In accordance with an embodiment, the display panel 210 may include pixels PX, and data lines DL1 to DLj and scan lines SL1 to SLi connected to the pixels PX. Here, j and i may each be a natural number greater than 1.

The data driver 222 may receive the data driver control signal DCS and the second image data DATA2 from the timing controller 221, and may generate a data signal. The data driver 222 may supply the generated data signal to the data lines DL1 to DLj. For connection to the data lines DL1 to DLj, the data driver 222 may be directly mounted on the substrate on which the pixels PX are formed, or may be connected to the substrate through a separate component, such as a flexible circuit board.

The scan driver 223 may supply scan signals to the scan lines SL1 to SLi in response to the scan driver control signal SCS. For example, the scan driver 223 may sequentially supply the scan signals to the scan lines SL1 to SLi. For connection to the scan lines SL1 to SLi, the scan driver 223 may be directly mounted on the substrate on which the pixels PX are formed, or may be connected to the substrate through a separate component, such as a flexible circuit board.

For example, when a scan signal is supplied to a specific scan line, some of the pixels PX connected to the specific scan line may receive data signals transmitted from the data lines DL1 to DLj, and some of the pixels PX may emit light having a desired luminance corresponding to the received data signals.

Although the timing controller 221, the data driver 222, and the scan driver 223 are illustrated individually in FIG. 2, at least some of these components may be integrated together as necessary or desired.

Electrodes to which voltages and/or signals for driving the display panel 210 are supplied may be referred to as panel electrodes. The panel electrodes may include (e.g., may be) the data lines DL1 to DLj, the scan lines SL1 to SLi, a first power source ELVDD, a second power source ELVSS, and the like. A driving voltage may be supplied to a panel electrode. For example, the pixels PX may generate light corresponding to the data signal by a current flowing from the first power source ELVDD to the second power source ELVSS through a light-emitting device. The first power source ELVDD may be a high potential voltage, and the second power source ELVSS may be a low potential voltage.

Figure 3:
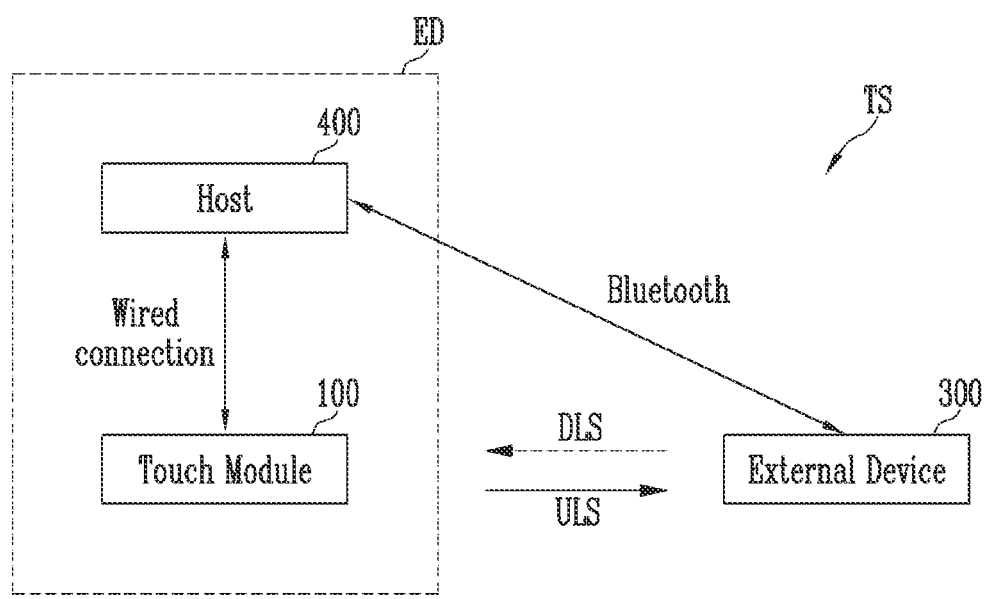
FIG. 3 is a block diagram illustrating a touch system including an electronic device in accordance with an embodiment of the present disclosure.

FIG. 3 is a block diagram illustrating a touch system including an electronic device in accordance with an embodiment of the present disclosure.

Referring to FIGS. 1 and 3, the touch system TS may include an electronic device ED and the external device 300. The electronic device ED may include the touch module 100 and the host 400.

The touch module 100 may include the touch array 110 and the touch driver 120. The touch driver 120 may generate uplink signals ULS by applying touch driving signals to the touch array 110. The touch driver 120 may transmit the generated uplink signals ULS to the external device 300 by capacitive coupling through a plurality of touch electrodes disposed on the touch array 110. As such, the uplink signals ULS may be transmitted to the external device 300 through a capacitor formed between the touch electrode of the touch array 110 and the external device 300. For example, the uplink signals ULS may include position information, synchronization information, information about the touch array 110, protocol information, and/or the like corresponding to the touch driving signals.

The host 400 may include an internal memory, one or more processors, and an interface. The host 400 may execute various software programs through a processor to perform various functions for the electronic device ED, and may perform processing and control for data communication. In addition, the host 400 may communicate with any suitable external device and/or system through various interfaces. For example, the electronic device DE including the host 400 and the touch module 100 may include a computing device, such as a laptop, a mobile phone, a smartphone, or a wearable device. As another example, the host 400 may be a separate computing device connected to the touch module 100 through communication.

The host 400 may communicate with the external device 300. For example, the host 400 may include a transmission device that performs serial communication for direct connection, such as a serial bus (I2C), a universal serial bus (USB), a serial peripheral interface (SPI), and/or RS-232, and wireless communication for indirect connection, such as Bluetooth (e.g., Bluetooth Low Energy), WiFi direct, Infrared data association (IrDA) local area network (LAN), and/or wide area network (WAN).

The host 400 may communicate with the external device 300 or the touch module 100 through a transmission device. For example, the host 400 may transmit location information corresponding to the external device that is received from the external device 300 through Bluetooth communication to the touch module 100 through serial communication.

As illustrated in FIG. 3, the touch module 100 may transmit the uplink signals ULS to the external device 300, and the external device 300 may receive the uplink signals ULS. In addition, the external device 300 may calculate the location information corresponding to the external device 300 by using the uplink signals ULS.

The external device 300 may transmit the calculated location information corresponding to the external device 300 to the host 400 through Bluetooth communication. As another example, the external device 300 may transmit, to the touch module 100, downlink signals DLS including the calculated location information corresponding to the external device 300.

Figure 4:
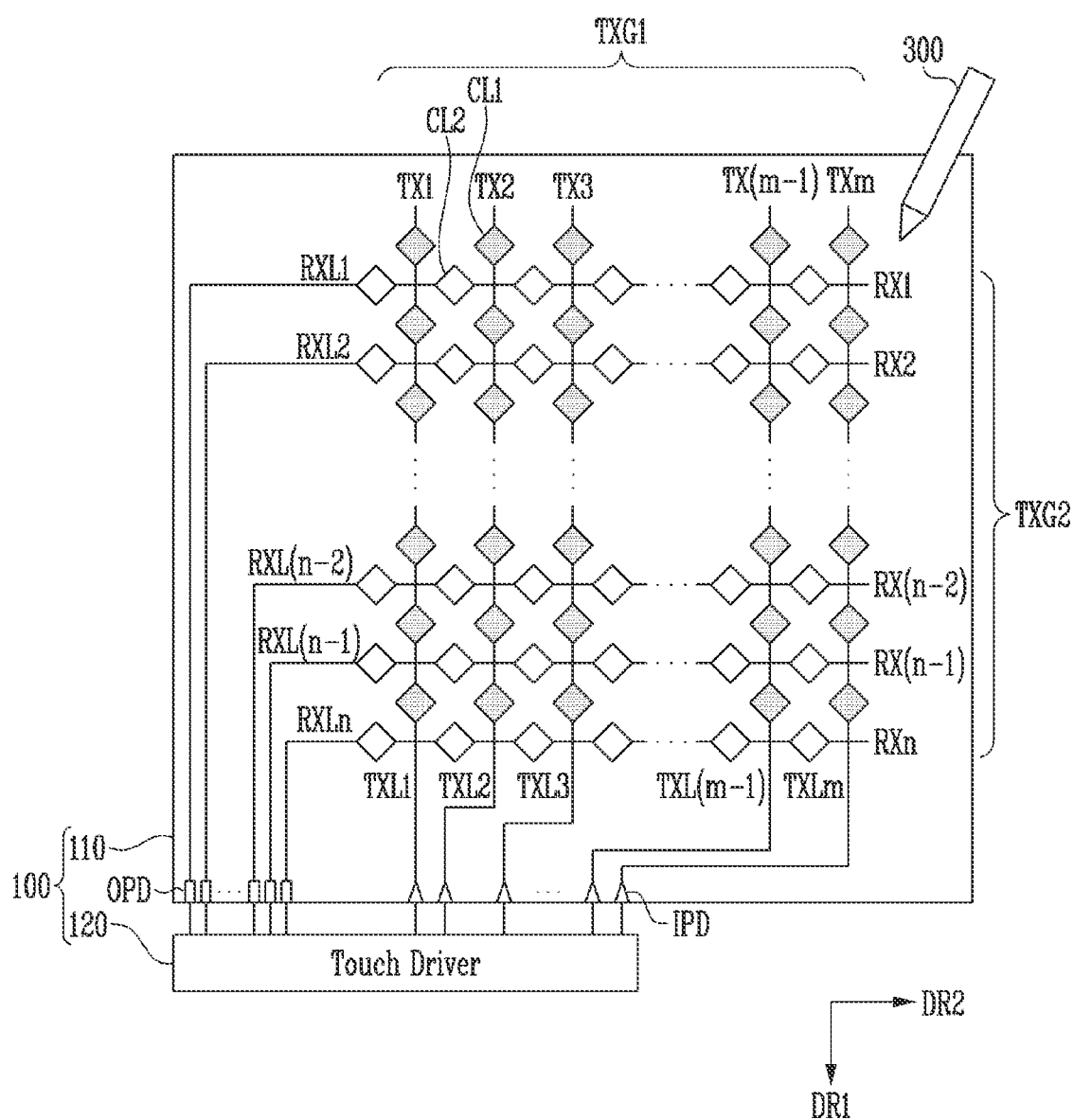
FIG. 4 is a block diagram illustrating an embodiment of the touch module of FIG. 3.

FIG. 4 is a block diagram illustrating an embodiment of the touch module of FIG. 3.

Referring to FIG. 4, the touch electrodes of the touch array 110 may include first to m-th driving electrodes TX1 to TXm, and first to n-th sensing electrodes RX1 to RXn. Here, m and n may each be a natural number greater than 1.

The first to m-th driving electrodes TX1 to TXm may extend in a first direction DR1, and may be spaced apart from each other along a second direction DR2. The first to n-th sensing electrodes RX1 to RXn may extend in the second direction DR2, and may be spaced apart from each other along the first direction DR1. The first to n-th sensing electrodes RX1 to RXn may be electrically separated from the first to m-th driving electrodes TX1 to TXm, while crossing the first to m-th driving electrodes TX1 to TXm, and may form a mutual capacitance with the first to m-th driving electrodes TX1 to TXm. The mutual capacitance may change when the touch of the user is applied to the touch array 110. For example, the touch may include at least one of various suitable kinds of inputs that cause a change in the mutual capacitance, such as a user's physical contact or hovering.

The first to m-th driving electrodes TX1 to TXm may be connected to first to m-th driving lines TXL1 to TXLm, respectively. The first to n-th sensing electrodes RX1 to RXn may be connected to first to n-th sensing lines RXL1 to RXLn, respectively. In this case, the first to m-th driving electrodes TX1 to TXm may be provided as the driving electrodes TX of FIG. 1, and the first to n-th sensing electrodes RX1 to RXn may be provided as the sensing electrodes RX of FIG. 1.

Each of the first to m-th driving electrodes TX1 to TXm may include first cells CL1 arranged along the first direction DR1, and electrically connected to each other. Each of the first to n-th sensing electrodes RX1 to RXn may include second cells CL2 arranged along the second direction, and electrically connected to each other. In FIG. 4, each of the first cells CL1 and the second cells CL2 are illustrated as having a diamond shape. However, the present disclosure is not limited thereto, and the first cells CL1 and the second cells CL2 may have at least one of various shapes, such as a circular shape, a square shape, a triangular shape, or a mesh shape. In addition, the first cells CL1 and the second cells CL2 may be formed of a single layer or multiple layers. As such, the shapes and arrangements of the first to m-th driving electrodes TX1 to TXm and the first to n-th sensing electrodes RX1 to RXn may be variously modified as needed or desired.

In one or more embodiments, the first cells CL1 and the second cells CL2 may have conductivity by including at least one of various suitable conductive materials, such as a metal material and/or a transparent conductive material. For example, the first cells CL1 and the second cells CL2 may each include at least one of various suitable metal materials, such as gold (Au), silver (Ag), aluminum (Al), molybdenum (Mo), chromium (Cr), titanium (Ti), nickel (Ni), neodymium (Nd), copper (Cu), platinum (Pt), or any suitable alloy thereof.

The touch array 110 may be provided as the touch array 110 of FIG. 1.

The touch array 110 may further include input pads IPD connected to the first to m-th driving lines TXL1 to TXLm. The touch driver 120 may be connected to the first to m-th driving lines TXL1 to TXLm through the input pads IPD. In addition, the touch array 110 may further include output pads OPD connected to the first to n-th sensing lines RXL1 to RXLn. The touch driver 120 may be connected to the first to n-th sensing lines RXL1 to RXLn through the output pads OPD.

The touch driver 120 may transmit the uplink signals ULS to the external device 300 adjacent to the touch array 110 by applying the touch driving signals including different codes to the touch electrodes of the touch array 110.

Referring to FIGS. 3 and 4, the touch module 100 may transmit the uplink signals ULS to the external device 300 through the first to m-th driving electrodes TX1 to TXm and/or the first to n-th sensing electrodes RX1 to RXn. For example, the touch driver 120 may transmit the uplink signals ULS to the external device 300 by applying the touch driving signals to the first to m-th driving electrodes TX1 to TXm through the first to m-th driving lines TXL1 to TXLm. The touch driver 120 may transmit the uplink signals to the external device 300 by applying the touch driving signals to the first to n-th sensing electrodes RX1 to RXn through the first to n-th sensing lines RXL1 to RXLn.

When the external device 300 touches the touch array 110 or is adjacent to the touch array 110, the external device 300 may receive the uplink signals ULS through at least some of the first to m-th driving electrodes TX1 to TXm and/or the first to n-th sensing electrodes RX1 to RXn. The external device 300 may calculate the location information corresponding to the external device 300 on the touch array 110 by decoding the received uplink signals ULS.

Figure 5:
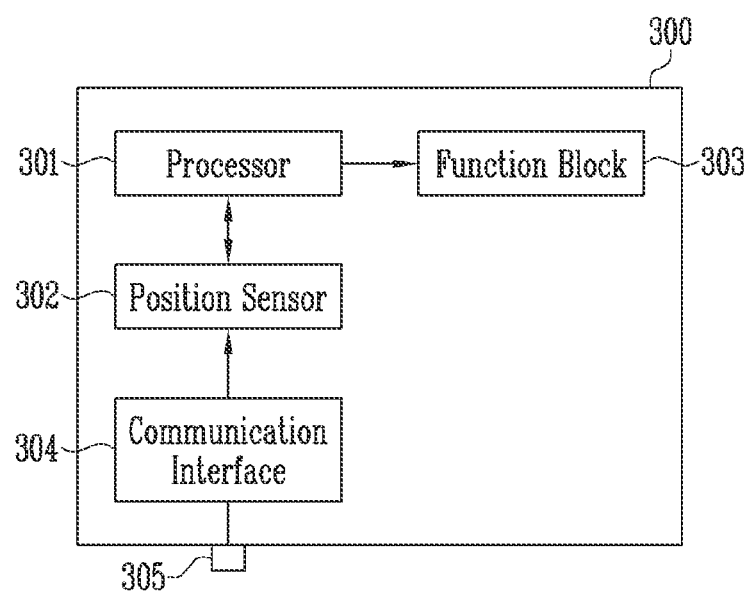
FIG. 5 is a block diagram illustrating an embodiment of an external device of FIG. 3.

FIG. 5 is a block diagram illustrating an embodiment of the external device of FIG. 3.

Referring to FIG. 5, the external device 300 may include a processor 301, a position sensor 302, a function block 303, a communication interface 304, and a receiving electrode 305.

In one or more embodiments, the external device 300 may be any suitable external device, such as an active pen, a robot, various accessories, and/or a game card.

The processor 301 may control the overall operations of the external device 300. For example, the processor 301 may control the position sensor 302. The processor 301 may control the operation of the position sensor 302 by transmitting a position sensor control signal to the position sensor 302. The position sensor 302 may calculate position information corresponding to the external device 300 by decoding the uplink signals ULS received from the communication interface 304.

The processor 301 may receive the position information from the position sensor 302, and may transmit the received position information to the function block 303. The function block 303 may perform various suitable functions by using the received position information. For example, the function block 303 may include a motor for moving the external device 300 in a specific direction. In this case, the function block 303 may move the external device 300 by driving the motor according to the received position information.

In one or more embodiments, the processor 301 may control the position sensor 302 and the communication interface 304 to transmit the position information to the touch module 100. In this case, the position sensor 302 may encode the position information corresponding to the external device 300, and provide the encoded position information to the communication interface 304. The communication interface 304 may perform wireless communication for indirect connection, such as Bluetooth (e.g., Bluetooth Low Energy), WiFi direct, IrDA LAN, and/or WAN. The communication interface 304 may transmit, to the host (e.g., see 400 of FIG. 3), a data signal obtained by encoding the position information. As another example, the communication interface 304 may transmit downlink signals DLS, including the data signal obtained by encoding the position information, to the touch array 110 through the receiving electrode 305.

The receiving electrode 305 of the external device 300 may be connected to the communication interface 304. When the receiving electrode 305 is adjacent to the touch array 110, a relatively low capacitor may be formed between the receiving electrode 305 and at least some of the driving electrodes TX and/or the sensing electrodes RX. In this case, the external device 300 may communicate uplink signals ULS and/or downlink signals DLS with the corresponding driving electrodes TX and/or sensing electrodes RX through the relatively low capacitor.

The communication interface 304 may amplify the received signal. For example, the communication interface 304 may amplify signals received through the receiving electrode 305 in the process of receiving the uplink signals ULS. For example, the communication interface 304 may amplify signals received from the position sensor 302 in the process of receiving the downlink signals DLS.

The communication interface 304 may convert analog signals into digital signals, and may convert digital signals into analog signals. For example, the communication interface 304 may convert the uplink signals ULS received through the receiving electrode 305 into digital signals, and may provide the digital signals to the position sensor 302. For example, the communication interface 304 may convert the digital signals received from the position sensor 302 into downlink signals DLS, and may output the downlink signals DLS through the receiving electrode 305.

The touch module 100 may receive the downlink signals DLS through a touch electrode adjacent to the receiving electrode 305 from among the driving electrodes TX and the sensing electrodes RX of the touch array 110.

Figure 6:
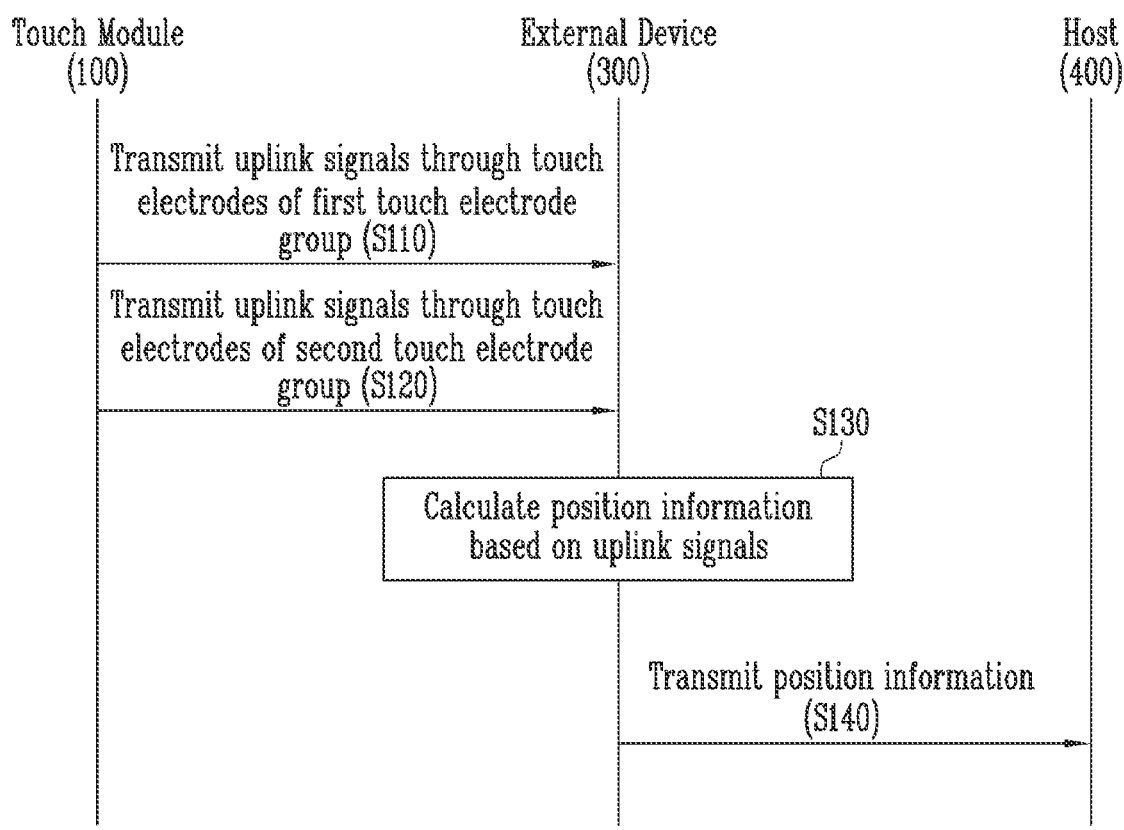
FIG. 6 is a flowchart illustrating an operation of the touch system of FIG. 3.

FIG. 6 is a flowchart illustrating an operation of the touch system of FIG. 3.

Referring to FIGS. 3, 4, and 6, the touch module 100 may transmit the uplink signal ULS to the external device 300, and the external device 300 may calculate position information and transmit the position information to the host 400. The touch module 100 and the host 400 may be included in the electronic device DE.

The touch module 100 may transmit uplink signals ULS through touch electrodes of a first touch electrode group TXG1 (S110). In addition, the touch module 100 may transmit uplink signals ULS through touch electrodes of a second touch electrode group TXG2 (S120). The touch module 100 may transmit the uplink signals ULS by applying touch driving signals and at least one synchronization signal to the touch electrodes of the first touch electrode group TXG1. The touch module 100 may transmit the uplink signals ULS by applying touch driving signals and at least one synchronization signal to the touch electrodes of the second touch electrode group TXG2. For example, after transmitting the uplink signals ULS through the touch electrodes of the first touch electrode group TXG1, the touch module 100 may transmit the uplink signals ULS through the touch electrodes of the second touch electrode group TXG2. As another example, the touch module 100 may concurrently or substantially simultaneously transmit the uplink signals ULS through the touch electrodes of the first touch electrode group TXG1 and the touch electrodes of the second touch electrode group TXG2.

Thereafter, the external device 300 may calculate position information corresponding to the external device 300 based on the received uplink signals ULS (S130). The external device 300 may use at least one synchronization signal to align different codes included in the received uplink signals ULS. For example, the external device 300 may receive the synchronization signal together with the uplink signals ULS, may align the codes included in the uplink signals ULS by using the synchronization signal, and may calculate the position information corresponding to the external device 300 from the aligned codes. Because the external device 300 calculates the position information from the aligned codes, the calculated position information may have high reliability.

Thereafter, the external device 300 may transmit the calculated position information to the host 400 (S140). The external device 300 may transmit the calculated position information through a communication channel. In addition, the external device 300 may transmit state information, as well as the position information, corresponding to the external device 300 to the host 400 through a wireless communication channel based on Bluetooth communication. However, the present disclosure is not limited thereto, and the kind of communication channel is not limited thereto.

Figure 7:
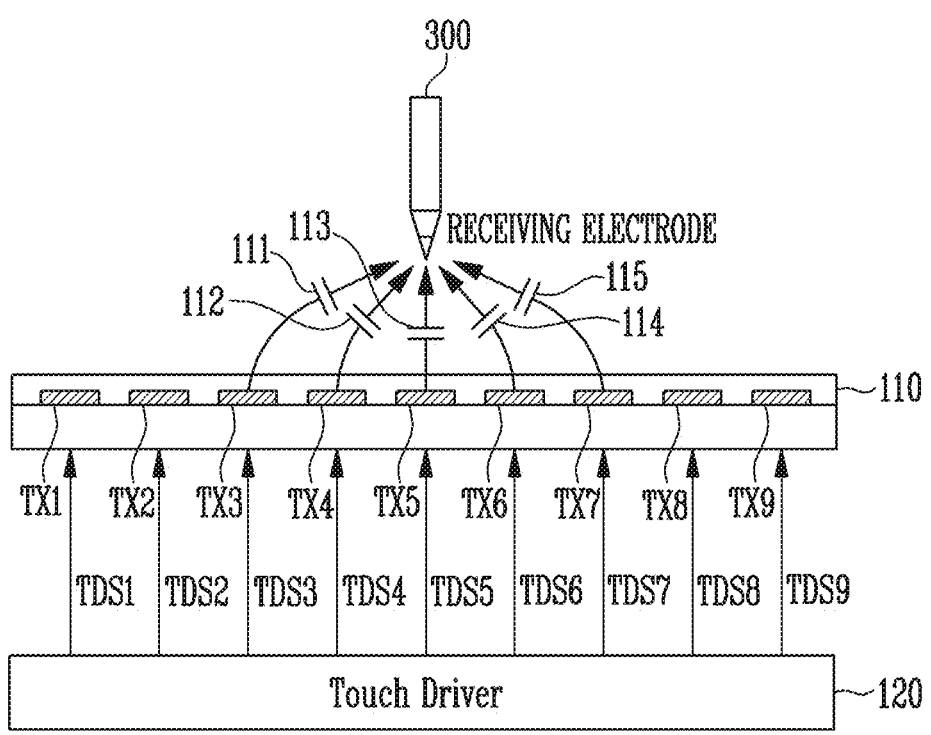
FIG. 7 is a diagram illustrating uplink signals received by the external device of FIG. 3.

FIG. 7 is a diagram illustrating uplink signals received by the external device of FIG. 3.

Referring to FIG. 7, an operation in which the external device 300 receives the uplink signals ULS through capacitors formed between adjacent touch electrodes is illustrated. In FIG. 7, the external device 300 is illustrated as an active pen, but the present disclosure is not limited thereto.

As illustrated in FIG. 7, the touch driver 120 may apply touch driving signals TDS1 to TDS9 including different codes to first to ninth driving electrodes TX1 to TX9 of the touch array 110, respectively. When the external device 300 is adjacent to the touch array 110, the external device 300 may receive the uplink signals ULS through capacitors 111 to 115 formed between third to seventh driving electrodes TX3 to TX7 that are adjacent to one another.

The uplink signals ULS may include digital components indicating different codes, and analog components of capacitors formed between the touch electrodes and an object. For example, the uplink signals ULS transmitted from the third to seventh touch electrodes TX3 to TX7 may each include a digital component according to the corresponding touch driving signal, and an analog component according to the corresponding capacitor.

The external device 300 may calculate the position information corresponding to the external device 300 based on the uplink signals ULS received from the third to seventh touch electrodes TX3 to TX7. For example, the external device 300 may determine weights for the respective uplink signals ULS based on the analog components according to the capacitors 111 to 115, and may apply the determined weights to the respective uplink signals ULS. The external device 300 may calculate the position information corresponding to the external device 300 by decoding the uplink signals ULS, to which the weights are applied, and/or digital components thereof. A suitable algorithm may be applied to decode the uplink signals and/or the digital components thereof. As such, the external device 300 may determine the position information of the external device 300 based on the uplink signals ULS received from at least one touch electrode adjacent to the external device 300.

For convenience of illustration, the first to ninth driving electrodes TX1 to TX9, which are part of the touch array 110 of FIG. 4, are shown in FIG. 7, and other touch electrodes may not be shown. However, the present disclosure is not limited thereto, and a case where the uplink signals ULS are transmitted through the other touch electrodes (e.g., the sensing electrodes RX) may be performed in the same or substantially the same (or similar) way.

Figure 8:
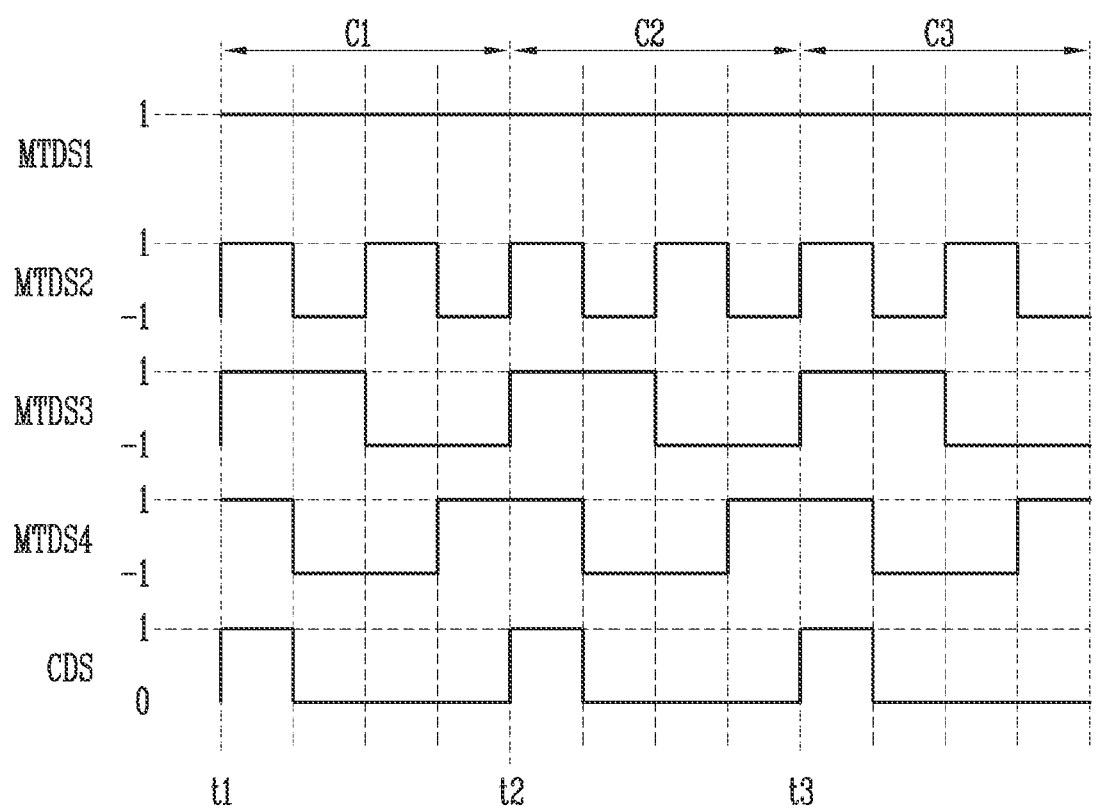
FIG. 8 is a timing diagram illustrating an example of touch driving signals and a synchronization signal applied to touch electrodes.

FIG. 8 is a timing diagram illustrating an example of touch driving signals and a synchronization signal applied to touch electrodes.

Referring to FIG. 8, first to fourth touch driving signals MTDS1 to MTDS4 and at least one synchronization signal CDS may be concurrently or substantially simultaneously applied to the touch array 110 (e.g., see FIG. 1). Touch driving signals MTDS1 to MTDS4 having four different codes are illustrated in FIG. 8, but the present disclosure is not limited thereto. Fewer than or more than four touch driving signals may be concurrently or substantially simultaneously applied to the touch array 110. For example, the number of touch driving signals may be determined according to the number of touch electrodes included in each sub-touch electrode group to which the touch driving signals are concurrently or substantially simultaneously applied.

The synchronization signal CDS may be a clock signal (e.g., a pulse signal) having a period (e.g., a certain or predetermined period). The period of the synchronization signal CDS may define first to third time intervals C1 to C3.

For example, the synchronization signal CDS may be used to distinguish units (e.g., periods) of codes included in the touch driving signals. The synchronization signal CDS may be generated so that a touch is sensed based on the unit in which the codes are repeated. The synchronization signal CDS may be toggled at a period (e.g., a certain or predetermined period), and the period of the synchronization signal CDS may correspond to the unit in which the codes are repeated. A first time point t1 may be a time point when the synchronization signal CDS transitions to a high level, and may correspond to a time point when the first time interval C1 starts. A second time point t2 may be a time point when the synchronization signal CDS transitions to a high level, and may correspond to a time point when the second time interval C2 starts. A third time point t3 may be a time point when the synchronization signal CDS transitions to a high level, and may correspond to a time point when the third time interval C3 starts.

The first to fourth touch driving signals MTDS1 to MTDS4 may each be repeated in period units (e.g., certain or predetermined period units), and the period of at least some of the first to fourth touch driving signals MTDS1 to MTDS4 may match the period of the synchronization signal CDS. The period of at least some of the first to fourth touch driving signals MTDS1 to MTDS4 may be an integer multiple of the period of the synchronization signal CDS.

For example, the first touch driving signal MTDS1 may have a code value of 1. The second touch driving signal MTDS2 may have a code value of 1, −1, 1, and −1 in each of the first to third time intervals C1 to C3. The third touch driving signal MTDS3 may have a code value of 1, 1, −1, and −1 in each of the first to third time intervals C1 to C3. The fourth touch driving signal MTDS4 may have a code value of 1, −1, −1, and 1 in each of the first to third time intervals C1 to C3. However, the present disclosure is not limited thereto, and each of the first to fourth touch driving signals MTDS1 to MTDS4 may have any suitable codes that may be different from one another.

In other words, the touch driving signals may include digital components, because the touch driving signals may be encoded based on different codes from each other, and modulated based on the encoded signals. The touch driving signals may be generated as various suitable kinds of square wave signals, such as pulses, sinusoidal waves, and/or triangle waves.

In accordance with an embodiment, the first to fourth touch driving signals MTDS1 to MTDS4 may include different codes from each other that are generated based on matrices with different numbers of bits according to the number of grouped touch electrodes. The different codes generated based on the matrices may be orthogonal to each other.

For example, when each of the codes constituting the first to fourth touch driving signals MTDS1 to MTDS4 performs a logical operation on a digital signal, or performs a digital logic operation by modulating an analog signal into a digital signal, a value of 1 may be output when the same code as the corresponding code is calculated, and a value of 0 may be output when a code different from the corresponding code is calculated.

As another example, each of the codes constituting the first to fourth touch driving signals MTDS1 to MTDS4 may be generated by variables of an orthogonal matrix. The orthogonal matrix may be a real matrix having row vectors and column vectors that form the normal orthogonal basis of a Euclidean space. In more detail, each of the first to fourth touch driving signals MTDS1 to MTDS4 may be generated by variables of rows 1 to 4 of an orthogonal matrix.

As such, the external device 300 may improve touch accuracy by performing signal processing of the touch driving signals in synchronization with a clock signal of the synchronization signal CDS included in the received uplink signals ULS.

Figure 9:
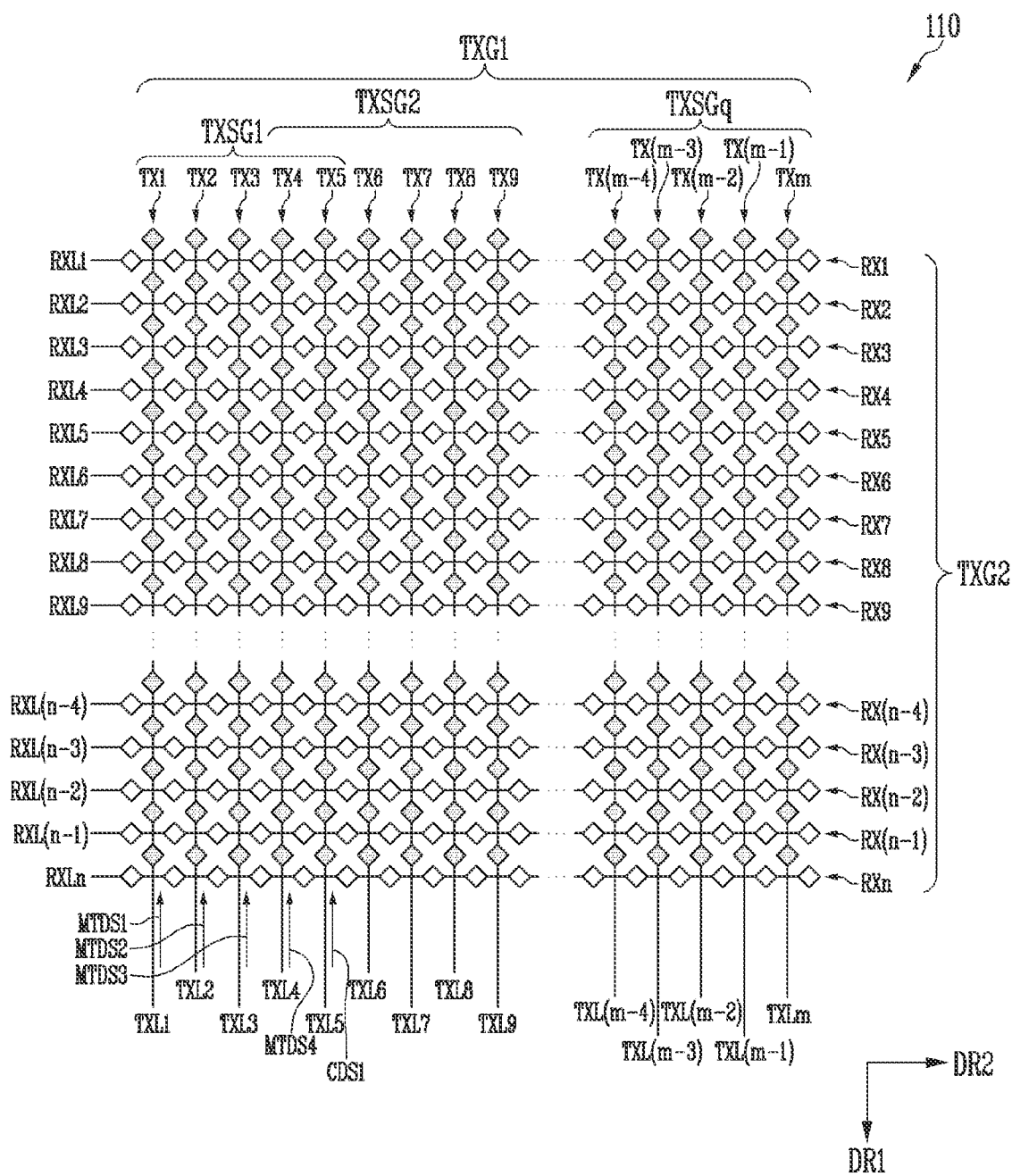
FIGS. 9-11 are diagrams illustrating an embodiment of a method for transmitting uplink signals through touch electrodes of a first touch electrode group.
Figure 10:
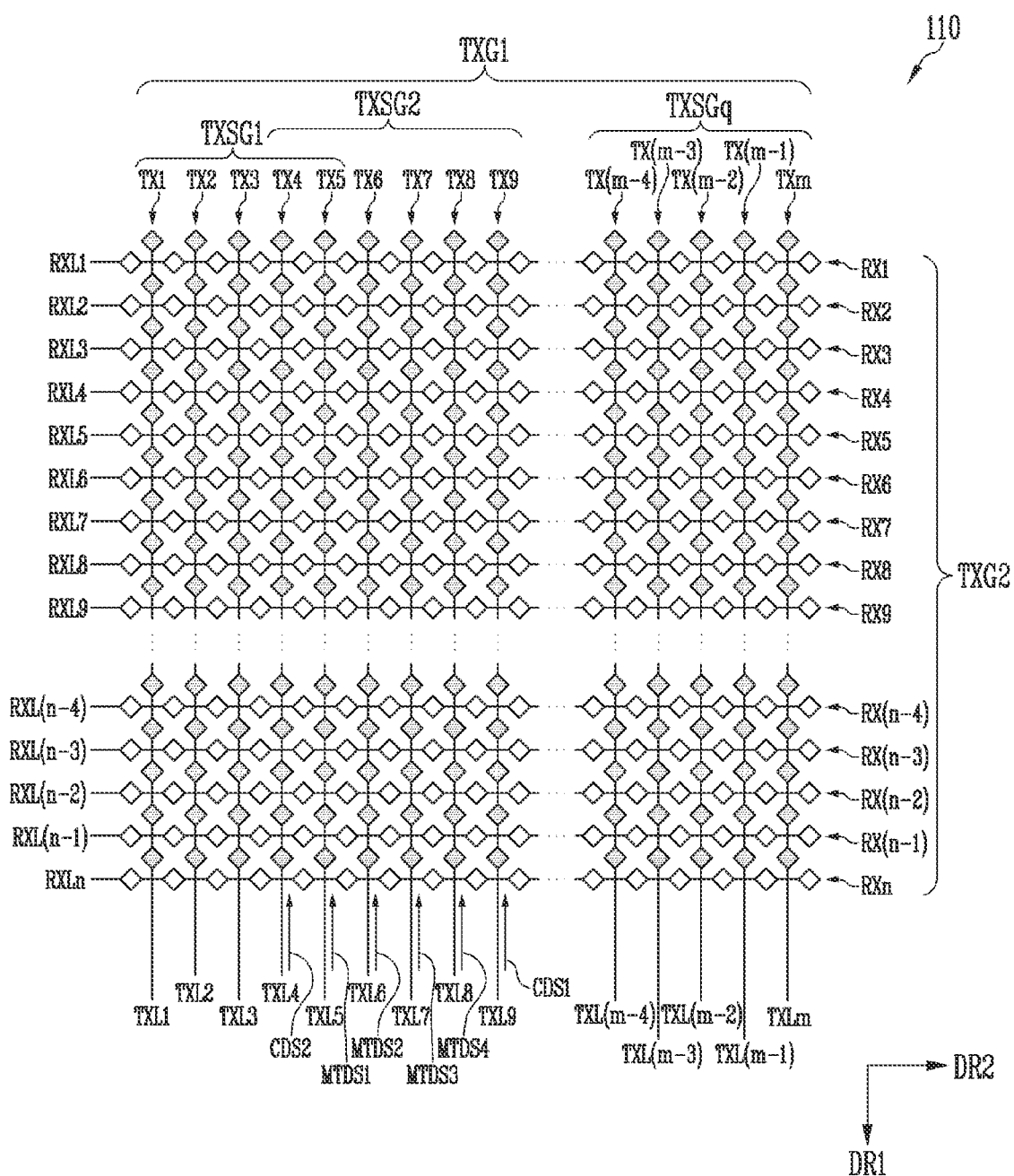
Figure 11:
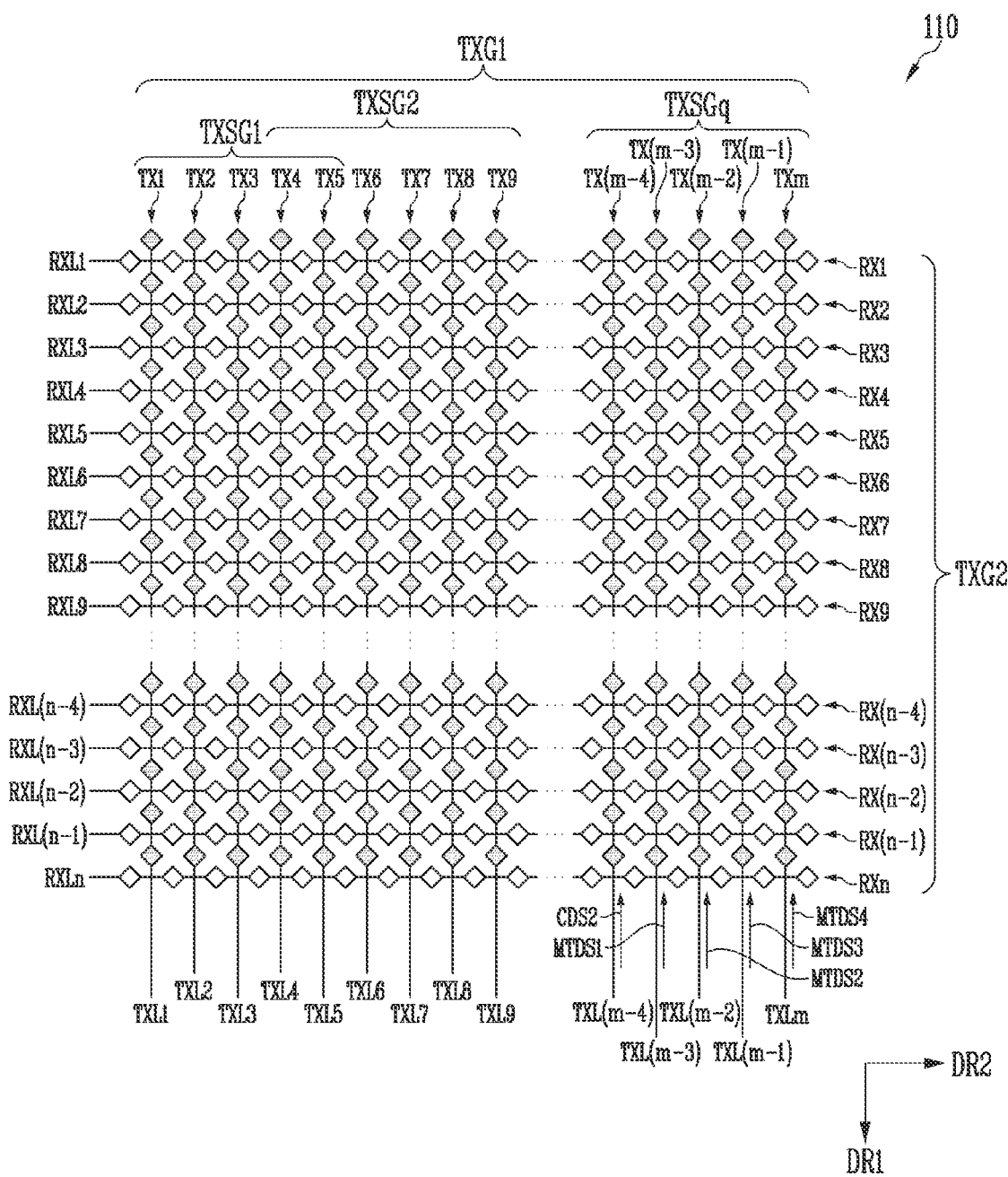

FIGS. 9 through 11 are diagrams illustrating an embodiment of a method for transmitting uplink signals through touch electrodes of a first touch electrode group.

Referring to FIGS. 9 to 11, first to m-th driving electrodes TX1 to TXm, where m is a natural number greater than 1, may be grouped into sub-touch electrode groups TXSG1 to TXSGq, where q is a natural number greater than 1, based on touch driving signals applied concurrently or substantially simultaneously with each other.

For example, when first to fourth touch driving signals MTDS1 to MTDS4 are applied as illustrated in FIG. 8, a sub-touch electrode group adjacent to an edge of the touch array 110 may include five driving electrodes. For example, first to fifth driving electrodes TX1 to TX5 may be grouped into a first sub-touch electrode group TXSG1. In this case, m−4-th to m-th driving electrodes TX(m−4) to TXm may be grouped into a q-th sub-touch electrode group TXSGq.

A sub-touch electrode group that is spaced apart from the edge of the touch array 110 may include six driving electrodes. For example, fourth to ninth driving electrodes TX4 to TX9 may be grouped into a second sub-touch electrode group TXSG2.

Referring to FIGS. 8 and 9, the touch driver 120 may concurrently or substantially simultaneously apply the first to fourth touch driving signals MTDS1 to MTDS4 and the first synchronization signal CDS1 to the first sub-touch electrode group TXSG1. The first synchronization signal CDS1 may be the same signal as that of the synchronization signal CDS. Because the first sub-touch electrode group TXSG1 in the first touch electrode group TXG1 includes the first driving electrode TX1 that is adjacent to the edge of the touch array 110, the touch driver 120 may not apply the second synchronization signal CDS2. For example, the touch driver 120 may apply the first to fourth touch driving signals MTDS1 to MTDS4 to the first to fourth driving electrodes TX1 to TX4. Concurrently or substantially simultaneously (e.g., at the same time), the touch driver 120 may apply the first synchronization signal CDS1 to the fifth driving electrode TX5 adjacent to the first to fourth driving electrodes TX1 to TX4.

In more detail, the touch driver 120 may apply the first touch driving signal MTDS1 to the first driving electrode TX1 through the first driving line TXL1. The touch driver 120 may apply the second touch driving signal MTDS2 to the second driving electrode TX2 through the second driving line TXL2. The touch driver 120 may apply the third touch driving signal MTDS3 to the third driving electrode TX3 through the third driving line TXL3. The touch driver 120 may apply the fourth touch driving signal MTDS4 to the fourth driving electrode TX4 through the fourth driving line TXL4. In addition, the touch driver 120 may apply the first synchronization signal CDS1 to the fifth driving electrode TX5 through the fifth driving line TXL5. As such, the touch driver 120 may output uplink signals ULS to the external device 300 by concurrently or substantially simultaneously applying the first to fourth touch driving signals MTDS1 to MTDS4 and the first synchronization signal CDS1.

Referring to FIGS. 8 and 10, the touch driver 120 may concurrently or substantially simultaneously apply the first to fourth touch driving signals MTDS1 to MTDS4, the first synchronization signal CDS1, and the second synchronization signal CDS2 to the second sub-touch electrode group TXSG2. The second synchronization signal CDS2 may be the same signal as that of the first synchronization signal CDS1. In the first touch electrode group TXG1, the second sub-touch electrode group TXSG2 may include the fourth to ninth driving electrodes TX4 to TX9 that are spaced apart from each other with the first driving electrode TX1 adjacent to the edge of the touch array 110 between the edge and the second sub-touch electrode group TXSG2. For example, the touch driver 120 may apply the first to fourth touch driving signals MTDS1 to MTDS4 to the fifth to eighth driving electrodes TX5 to TX8. Concurrently or substantially simultaneously (e.g., at the same time), the touch driver 120 may apply the first synchronization signal CDS1 or the second synchronization signal CDS2 to the fourth driving electrode TX4 and the ninth driving electrode TX9 adjacent to the fifth to eighth driving electrodes TX5 to TX8. The driving electrodes to which the first to fourth touch driving signals MTDS1 to MTDS4 are applied may be disposed between the driving electrode to which the first synchronization signal CDS1 is applied and the driving electrode to which the second synchronization signal CDS2 is applied.

In more detail, the touch driver 120 may apply the first touch driving signal MTDS1 to the fifth driving electrode TX5 through the fifth driving line TXL5. The touch driver 120 may apply the second touch driving signal MTDS2 to the sixth driving electrode TX2 through the sixth driving line TXL6. The touch driver 120 may apply the third touch driving signal MTDS3 to the seventh driving electrode TX7 through the seventh driving line TXL7. The touch driver 120 may apply the fourth touch driving signal MTDS4 to the fourth driving electrode TX4 through the eighth driving line TXL8. The touch driver 120 may apply the first synchronization signal CDS1 to the ninth driving electrode TX9 through the ninth driving line TXL9, and may apply the second synchronization signal CDS2 to the fourth driving electrode TX4 through the fourth driving line TXL4. As such, the touch driver 120 may output uplink signals ULS to the external device 300 by concurrently or substantially simultaneously applying the first to fourth touch driving signals MTDS1 to MTDS4, the first synchronization signal CDS1, and the second synchronization signal CDS2.

Referring to FIGS. 8 and 11, the touch driver 120 may concurrently or substantially simultaneously apply the first to fourth touch driving signals MTDS1 to MTDS4 and the second synchronization signal CDS2 to the q-th sub-touch electrode group TXSGq. Because the q-th sub-touch electrode group TXSGq in the first touch electrode group TXG1 includes the m-th driving electrode TXm that is adjacent to the edge of the touch array 110, the touch driver 120 may not apply the first synchronization signal CDS1. For example, the touch driver 120 may apply the first to fourth touch driving signals MTDS1 to MTDS4 to the m−3-th to m-th driving electrodes TX(m−3) to TXm. Concurrently or substantially simultaneously (e.g., at the same time), the touch driver 120 may apply the second synchronization signal CDS2 to the m−4-th driving electrode TX(m−4) adjacent to the m−3-th to m-th driving electrodes TX(m−3) to TXm.

In more detail, the touch driver 120 may apply the first touch driving signal MTDS1 to the m−3-th driving electrode TX(m−3) through the m−3-th driving line TXL(m−3). The touch driver 120 may apply the second touch driving signal MTDS2 to the m−2-th driving electrode TX(m−2) through the m−2-th driving line TXL(m−2). The touch driver 120 may apply the third touch driving signal MTDS3 to the m−1-th driving electrode TX(m−1) through the m−1-th driving line TXL(m−1). The touch driver 120 may apply the fourth touch driving signal MTDS4 to the m-th driving electrode TXm through the m-th driving line TXLm. The touch driver 120 may apply the second synchronization signal CDS2 to the m−4-th driving electrode TX(m−4) through the m−4-th driving line TXL(m−4). As such, the touch driver 120 may output uplink signals ULS to the external device 300 by concurrently or substantially simultaneously applying the first to fourth touch driving signals MTDS1 to MTDS4 and the second synchronization signal CDS2.

The touch driver 120 may apply one of the first to fourth touch driving signals MTDS1 to MTDS4 to the first to m-th driving electrodes TX1 to TXm one by one. For example, the fifth driving electrode TX5 may be included in both the first sub-touch electrode group TXSG1 and the second sub-touch electrode group TXSG2. However, the first synchronization signal CDS1 may be applied to the fifth driving electrode TX5 included in the first sub-touch electrode group TXSG1, and the first touch driving signal MTDS1 may be applied to the fifth driving electrode TX5 included in the second sub-touch electrode group TXSG2. In other words, even when the fifth driving electrode TX5 is commonly included in different electrode groups, the touch driver 120 may apply only one touch driving signal to the fifth driving electrode TX5 at a time.

In addition, the touch electrodes of the second touch electrode group TXG2 may include first to n-th sensing electrodes RX1 to RXn, where n is a natural number greater than 1, that are sequentially arranged along the first direction. The signals applied to the touch electrodes of the second touch electrode group are described in more detail below with reference to FIGS. 12 to 14.

Figure 12:
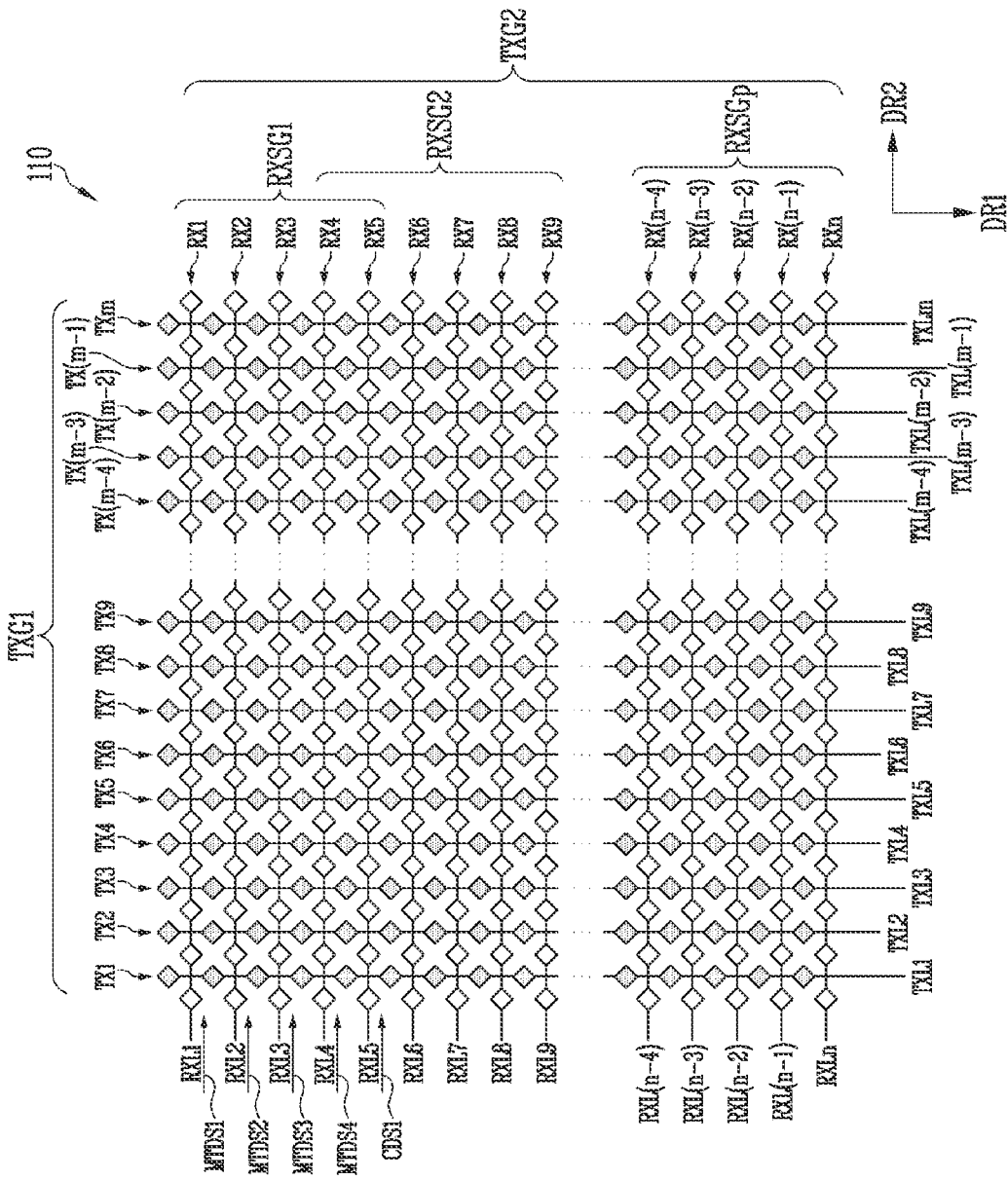
FIGS. 12-14 are diagrams illustrating an embodiment of a method for transmitting uplink signals through touch electrodes of a second touch electrode group.
Figure 13:
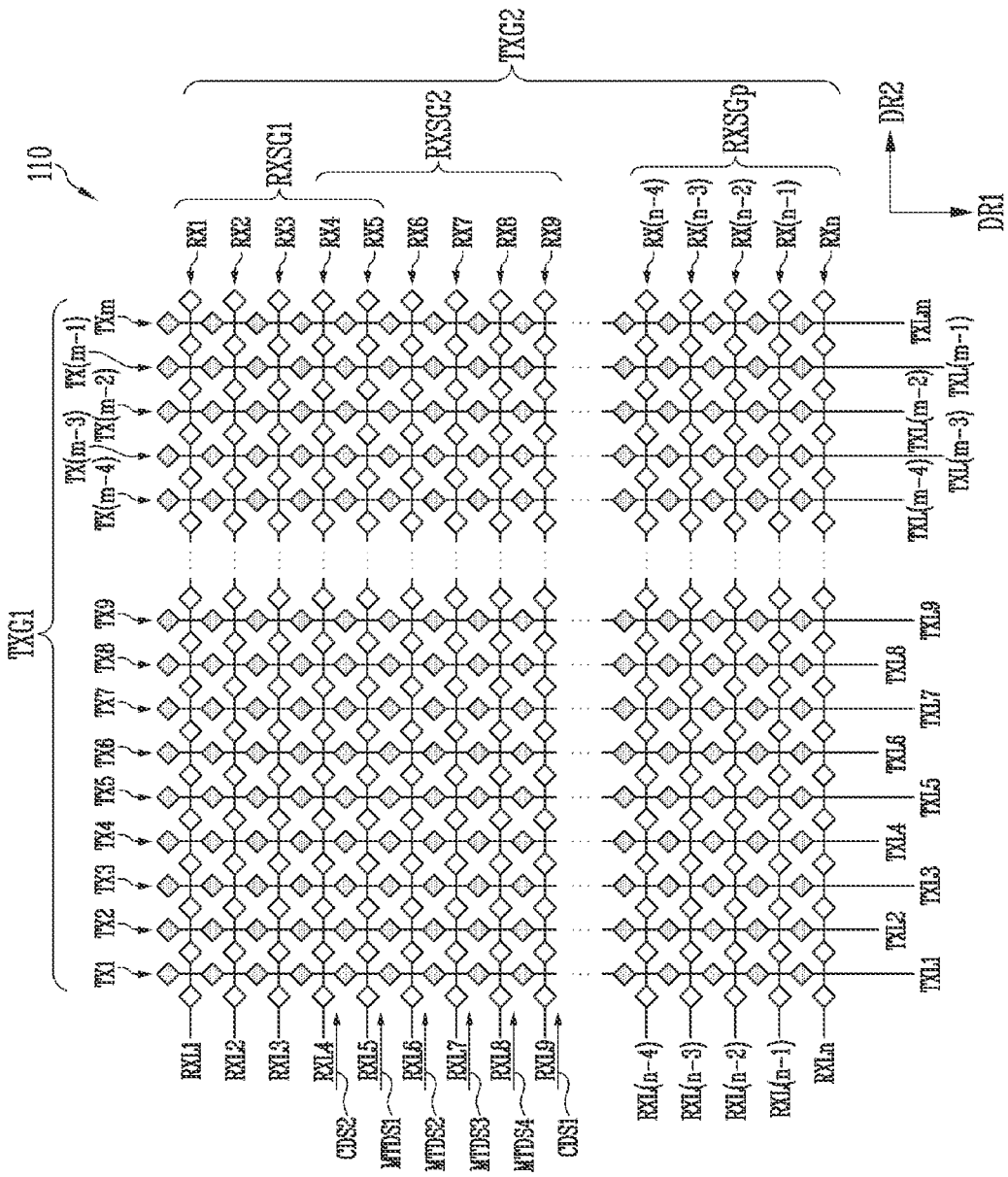
Figure 14:
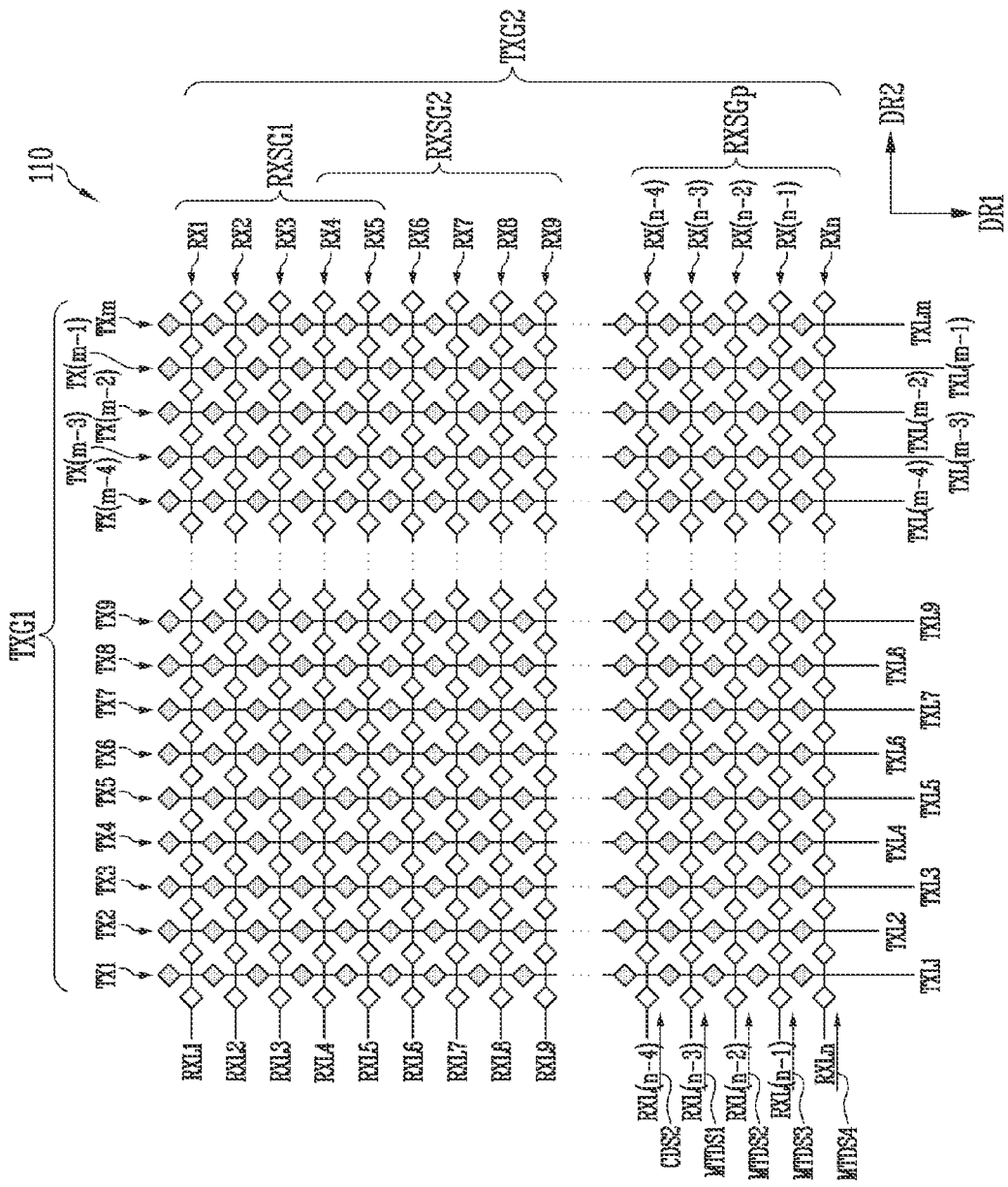

FIGS. 12 through 14 are diagrams illustrating an embodiment of a method for transmitting uplink signals through touch electrodes of a second touch electrode group.

Referring to FIGS. 12 through 14, the first to n-th sensing electrodes RX1 to RXn may be grouped into sub-touch electrode groups RXSG1 to RXSGp, where p is a natural number greater than 1, according to touch driving signals applied concurrently or substantially simultaneously with each other.

For example, as illustrated in FIG. 12, when first to fourth touch driving signals MTDS1 to MTDS4 are applied, the sub-touch electrode groups adjacent to the edge of the touch array 110 may each include five sensing electrodes. For example, the first to fifth sensing electrodes RX1 to RX5 may be grouped into the first sub-touch electrode group RXSG1. The n−4-th to n-th sensing electrodes RX(n−4) to RXn may be grouped into the p-th sub-touch electrode group RXSGp.

The sub-touch electrode group spaced apart from the edge of the touch array 110 may include six driving electrodes. For example, the fourth to ninth sensing electrodes RX4 to RX9 may be grouped into the second sub-touch electrode group RXSG2.

Referring to FIGS. 8 and 12, the touch driver 120 may concurrently or substantially simultaneously apply the first to fourth touch driving signals MTDS1 to MTDS4 and the first synchronization signal CDS1 to the first sub-touch electrode group RXSG1. Because the first sub-touch electrode group RXSG1 in the second touch electrode group TXG2 includes the first sensing electrode RX1 adjacent to the edge of the touch array 110, the touch driver 120 may not apply the second synchronization signal CDS2. For example, the touch driver 120 may apply the first to fourth touch driving signals MTDS1 to MTDS4 to the first to fourth sensing electrodes RX1 to RX4, respectively. Concurrently or substantially simultaneously (e.g., at the same time), the touch driver 120 may apply the first synchronization signal CDS1 to the fifth sensing electrode RX5 adjacent to the first to fourth sensing electrodes RX1 to RX4.

In more detail, the touch driver 120 may apply the first touch driving signal MTDS1 to the first sensing electrode RX1 through the first sensing line RXL1. The touch driver 120 may apply the second touch driving signal MTDS2 to the second sensing electrode RX2 through the second sensing line RXL2. The touch driver 120 may apply the third touch driving signal MTDS3 to the third sensing electrode RX3 through the third sensing line RXL3. The touch driver 120 may apply the fourth touch driving signal MTDS4 to the fourth sensing electrode RX4 through the fourth sensing line RXL4. The touch driver 120 may apply the first synchronization signal CDS1 to the fifth sensing electrode RX5 through the fifth sensing line RXL5. As such, the touch driver 120 may output uplink signals ULS to the external device 300 by concurrently or substantially simultaneously applying the first to fourth touch driving signals MTDS1 to MTDS4 and the first synchronization signal CDS1.

Referring to FIGS. 8 and 13, the touch driver 120 may concurrently or substantially simultaneously apply the first to fourth touch driving signals MTDS1 to MTDS4, the first synchronization signal CDS1, and the second synchronization signal CDS2 to the second sub-touch electrode group RXSG2. In the second touch electrode group TXG2, the second sub-touch electrode group RXSG2 may include the fourth to ninth sensing electrodes RX4 to RX9 that are spaced apart from each other with the first sensing electrode RX1 adjacent to the edge of the touch array 110 between the edge and the second sub-touch electrode group RXSG2. For example, the touch driver 120 may apply the first to fourth touch driving signals MTDS1 to MTDS4 to the fifth to eighth sensing electrodes RX5 to RX8, respectively. Concurrently or substantially simultaneously (e.g., at the same time), the touch driver 120 may apply the first synchronization signal CDS1 or the second synchronization signal CDS2 to the fourth sensing electrode RX4 and the ninth sensing electrode RX9 adjacent to the fifth to eighth sensing electrodes RX5 to RX8. The sensing electrodes to which the first to fourth touch driving signals MTDS1 to MTDS4 are applied may be disposed between the sensing electrode to which the first synchronization signal CDS1 is applied and the sensing electrode to which the second synchronization signal CDS2 is applied.

In more detail, the touch driver 120 may apply the first touch driving signal MTDS1 to the fifth sensing electrode RX5 through the fifth sensing line RXL5. The touch driver 120 may apply the second touch driving signal MTDS2 to the sixth sensing electrode RX6 through the sixth sensing line RXL6. The touch driver 120 may apply the third touch driving signal MTDS3 to the seventh sensing electrode RX7 through the seventh sensing line RXL7. The touch driver 120 may apply the fourth touch driving signal MTDS4 to the fourth sensing electrode RX4 through the eighth sensing line RXL8. The touch driver 120 may apply the first synchronization signal CDS1 to the ninth sensing electrode RX9 through the ninth sensing line RXL9, and may apply the second synchronization signal CDS2 to the fourth sensing electrode RX4 through the fourth sensing line RXL4. As such, the touch driver 120 may output uplink signals ULS to the external device 300 by concurrently or substantially simultaneously applying the first to fourth touch driving signals MTDS1 to MTDS4, the first synchronization signal CDS1, and the second synchronization signal CDS2.

Referring to FIGS. 8 and 14, the touch driver 120 may concurrently or substantially simultaneously apply the first to fourth touch driving signals MTDS1 to MTDS4 and the second synchronization signal CDS2 to the p-th sub-touch electrode group RXSGp. Because the p-th sub-touch electrode group RXSGp in the second touch electrode group TXG2 includes the n-th sensing electrode RXn adjacent to the edge of the touch array 110, the touch driver 120 may not apply the first synchronization signal CDS1. For example, the touch driver 120 may apply the first to fourth touch driving signals MTDS1 to MTDS4 to the n-3-th to n-th sensing electrodes RX(n-3) to RXn, respectively. Concurrently or substantially simultaneously (e.g., at the same time), the touch driver 120 may apply the second synchronization signal CDS2 to n-4-th sensing electrode RX(n-4) adjacent to the n-3-th to n-th sensing electrodes RX(n-3) to RXn.

In more detail, the touch driver 120 may apply the first touch driving signal MTDS1 to the n-3-th sensing electrode RX(n-3) through the n-3-th sensing line RXL(n-3). The touch driver 120 may apply the second touch driving signal MTDS2 to the n-2-th sensing electrode RX(n-2) through the n-2-th sensing line RXL(n-2). The touch driver 120 may apply the third touch driving signal MTDS3 to the n-1-th sensing electrode RX(n-1) through the n-1-th sensing line RXL(n-1). The touch driver 120 may apply the fourth touch driving signal MTDS4 to the n-th sensing electrode RXn through the n-th sensing line RXLn. The touch driver 120 may apply the second synchronization signal CDS2 to the n-4-th sensing electrode RX(n-4) through the n-4-th sensing line RXL(n-4). As such, the touch driver 120 may output uplink signals ULS to the external device 300 by concurrently or substantially simultaneously applying the first to fourth touch driving signals MTDS1 to MTDS4 and the second synchronization signal CDS2.

The touch driver 120 may apply one of the first to fourth touch driving signals MTDS1 to MTDS4 to the first to n-th sensing electrodes RX1 to RXn one by one. For example, the fifth sensing electrode RX5 may be included in both the first sub-touch electrode group RXSG1 and the second sub-touch electrode group RXSG2. However, the first synchronization signal CDS1 may be applied to the fifth sensing electrode RX5 included in the first sub-touch electrode group RXSG1, and the first touch driving signal MTDS1 may be applied to the fifth sensing electrode RX5 included in the second sub-touch electrode group RXSG2. In other words, even when the fifth sensing electrode RX5 is commonly included in different electrode groups, the touch driver 120 may apply only one touch driving signal to the fifth sensing electrode RX5 at a time.

Figure 15:
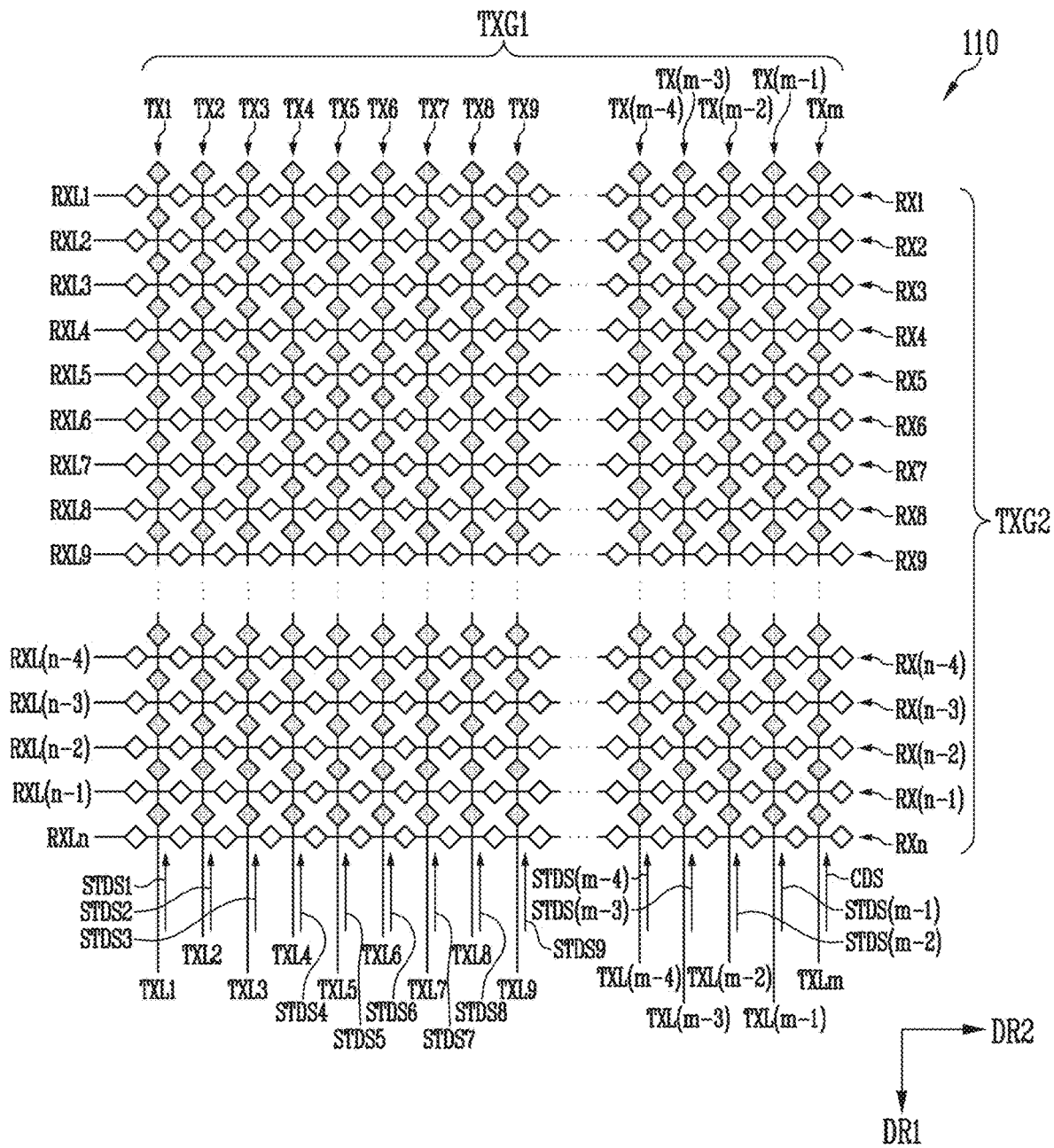
FIGS. 15 and 16 are diagrams illustrating an embodiment of a method for transmitting uplink signals through touch electrodes of a first touch electrode group.
Figure 16:
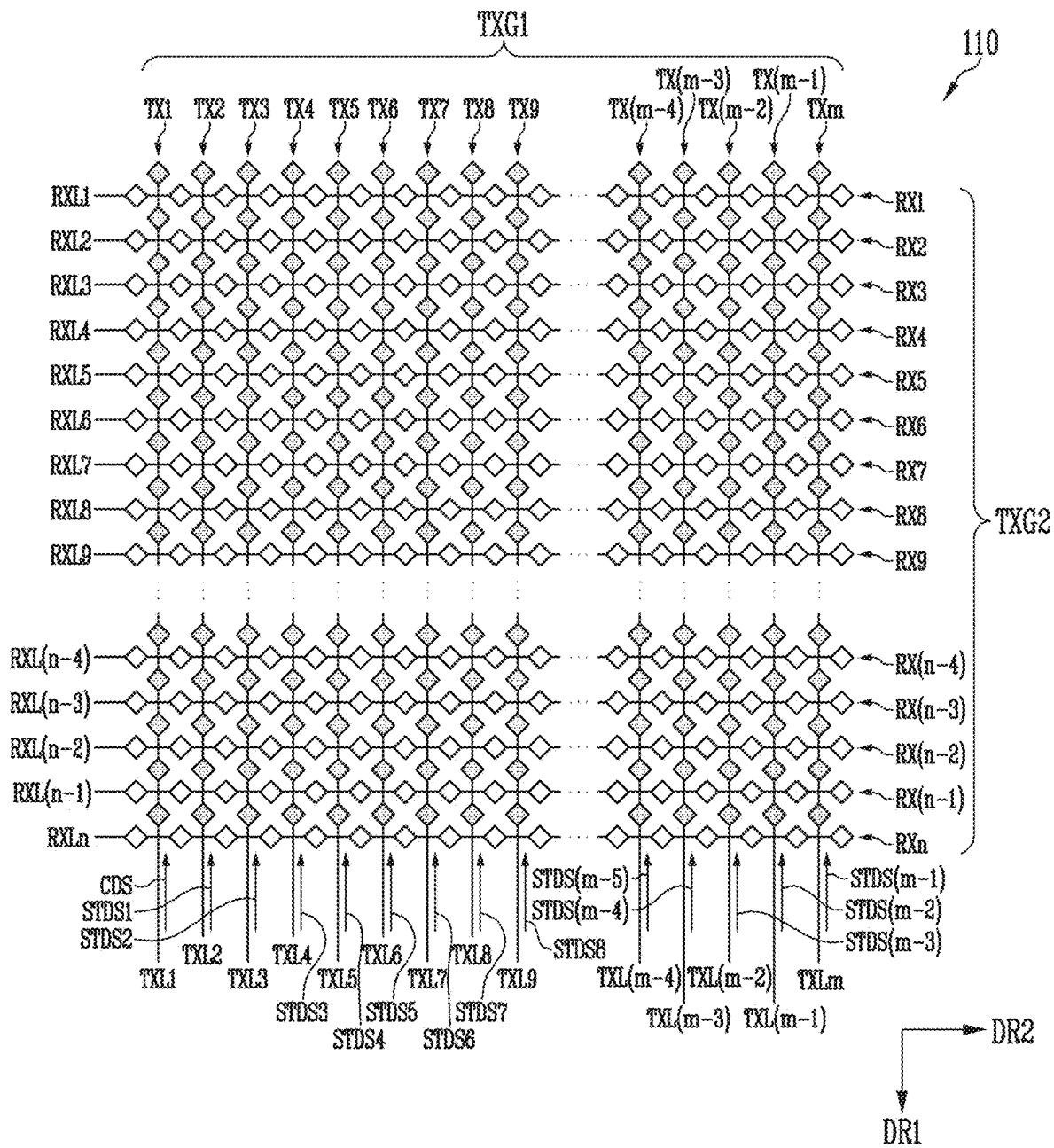

FIGS. 15 and 16 are diagrams illustrating an embodiment of a method for transmitting uplink signals through touch electrodes of a first touch electrode group.

Referring to FIGS. 15 and 16, touch driving signals and at least one synchronization signal may be applied to touch electrodes of a first touch electrode group TXG1 once each in a first time interval and a second time interval. However, instead of the touch driving signal, one synchronization signal may be applied to a first driving electrode TX1 and an m-th driving electrode TXm, where m is a natural number greater than 1, which are adjacent to the edges of the touch array 110 in one of the first time interval and the second time interval.

Referring to FIGS. 8 and 15, the touch driver 120 may concurrently or substantially simultaneously apply first to m-1-th touch driving signals STDS1 to STDS(m-1) and a synchronization signal CDS to the touch electrodes of the first touch electrode group TXG1 in the first time interval. The first to m-1-th touch driving signals STDS1 to STDS(m-1) may include different codes from each other, like those of the first to fourth touch driving signals MTDS1 to MTDS4 illustrated in FIG. 8.

For example, the touch driver 120 may apply the first to m-1-th touch driving signals STDS1 to STDS(m-1) to the first to m-1-th driving electrodes TX1 to TX(m-1), respectively. Concurrently or substantially simultaneously (e.g., at the same time), the touch driver 120 may apply the synchronization signal CDS to the m-th driving electrode TXm adjacent to the m-1-th driving electrode TX(m-1).

In more detail, the touch driver 120 may apply the first to m-1-th touch driving signals STDS1 to STDS(m-1) to the first to m-1-th driving electrodes TX1 to TX(m-1) through the first to m-1-th driving lines TXL1 to TXL(m-1) in the first time interval. The touch driver 120 may apply the synchronization signal CDS to the m-th driving electrode TXm through the m-th driving line TXLm adjacent to the edge of the touch array 110 in the first time interval. As such, the touch driver 120 may output uplink signals ULS to the external device 300 by concurrently or substantially simultaneously applying the first to m–1-th touch driving signals STDS1 to STDS(m–1) and the synchronization signal CDS in the first time interval.

Referring to FIGS. 8 and 16, the touch driver 120 may concurrently or substantially simultaneously apply the first to m–1-th touch driving signals STDS1 to STDS(m–1) and the synchronization signal CDS to the touch electrodes of the first touch electrode group TXG1 in a second time interval after the first time interval.

For example, the touch driver 120 may apply the first to m–1-th touch driving signals STDS1 to STDS(m–1) to the second to m-th driving electrodes TX2 to TXm, respectively. Concurrently or substantially simultaneously (e.g., at the same time), the touch driver 120 may apply the synchronization signal CDS to the first driving electrode TX1 adjacent to the second driving electrode TX2.

In more detail, the touch driver 120 may apply the first to m–1-th touch driving signals STDS1 to STDS(m–1) to the second to m-th driving electrodes TX2 to TXm through the second to m-th driving lines TXL2 to TXLm in the second time interval after the first time interval. The touch driver 120 may apply the synchronization signal CDS to the first driving electrode TX1 adjacent to the edge of the touch array 110 through the first driving line TXL1 in the second time interval. As such, the touch driver 120 may output uplink signals ULS to the external device 300 by concurrently or substantially simultaneously applying the first to m–1-th touch driving signals STDS1 to STDS(m–1) and the synchronization signal CDS in the second time interval after the first time interval.

When the touch driver 120 drives all channels concurrently or substantially simultaneously with each other, the synchronization signal may be alternately applied to the first driving electrode TX1 and the m-th driving electrode TXm adjacent to the edges of the touch array 110. Accordingly, the touch driving signals may be applied to all of the touch electrodes of the first touch electrode group TXG1. Additionally, as the synchronization signal is alternately applied to the left and right sides of the touch array 110, the external device 300 may accurately receive the synchronization signal regardless of its position on the touch array 110, thereby improving touch accuracy.

Figure 17:
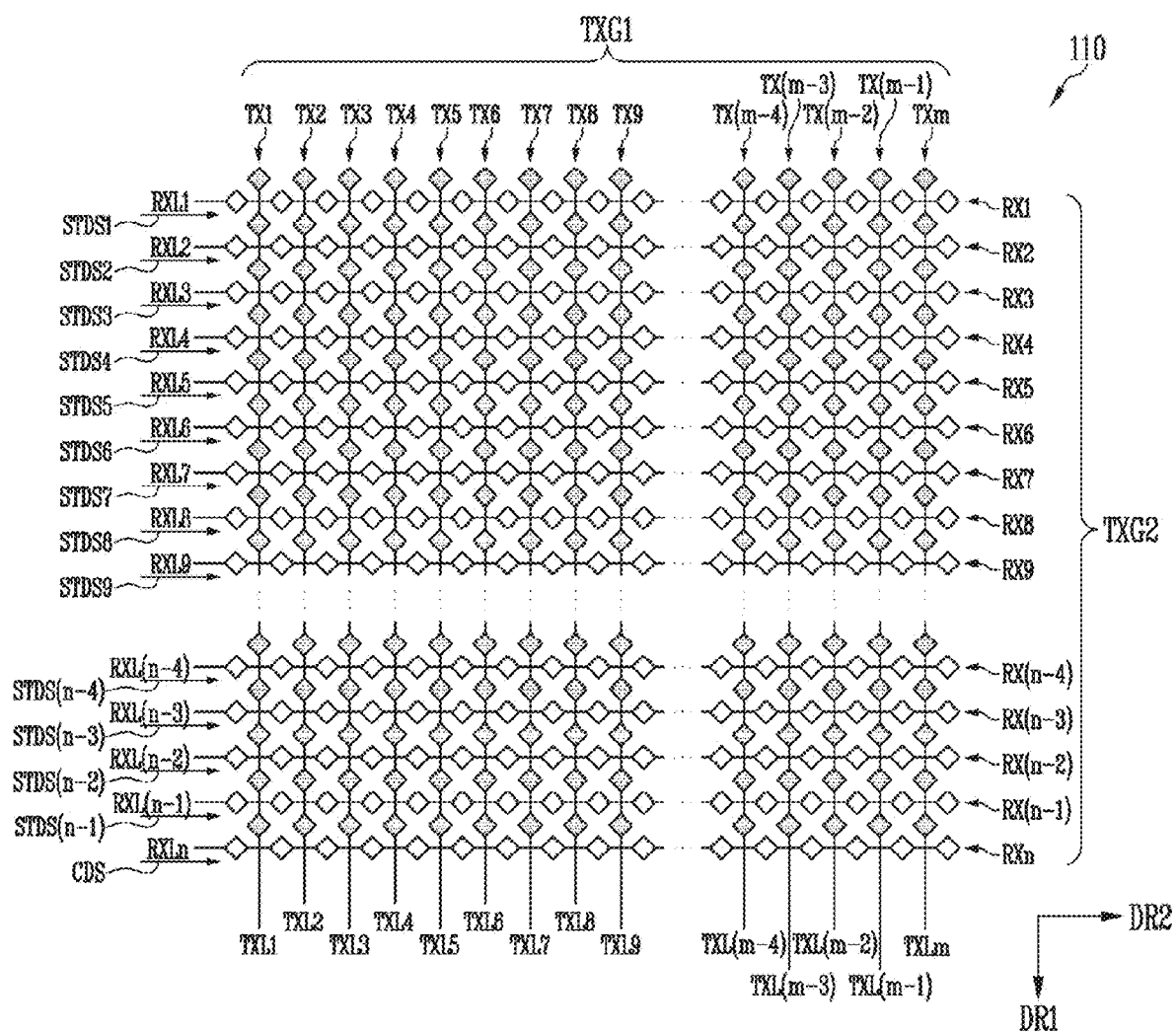
FIGS. 17 and 18 are diagrams illustrating an embodiment of a method for transmitting uplink signals through touch electrodes of a second touch electrode group.
Figure 18:
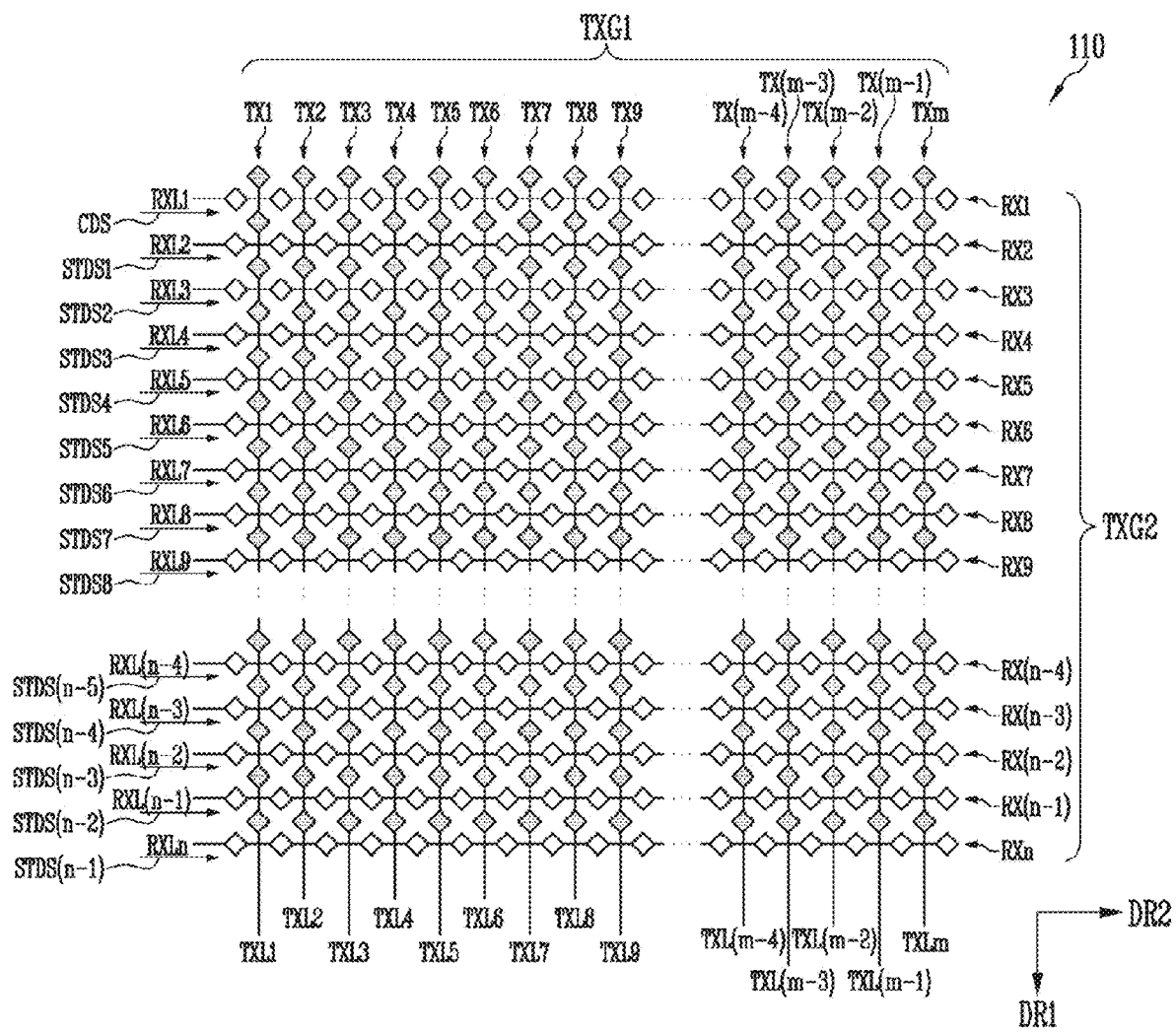

FIGS. 17 and 18 are diagrams illustrating an embodiment of a method for transmitting uplink signals through touch electrodes of a second touch electrode group.

Referring to FIGS. 17 and 18, as the touch driver 120 drives all channels concurrently or substantially simultaneously with each other, the touch driving signals and at least one synchronization signal may be applied to the touch electrodes of the second touch electrode group TXG2 once each in a third time interval and a fourth time interval. However, instead of the touch driving signal, one synchronization signal may be applied to a first sensing electrode RX1 and an n-th sensing electrode RXn adjacent to the edges of the touch array 110 in one of the third time interval and the fourth time interval.

Referring to FIGS. 8 and 17, the touch driver 120 may concurrently or substantially simultaneously apply the first to n–1-th touch driving signals STDS1 to STDS(n–1) and the synchronization signal CDS to the touch electrodes of the second touch electrode group TXG2 in the third time interval after the second time interval.

For example, the touch driver 120 may apply the first to n–1-th touch driving signals STDS1 to STDS(n–1) to the first to n–1-th sensing electrodes RX1 to RX(n–1), respectively. Concurrently or substantially simultaneously (e.g., at the same time), the touch driver 120 may apply the synchronization signal CDS to the n-th sensing electrode RXn adjacent to the n–1-sensing electrode RX(n–1).

In more detail, the touch driver 120 may apply the first to n–1-th touch driving signals STDS1 to STDS(n–1) to the first to n–1-th sensing electrodes RX1 to RX(n–1) through the first to n–1-th sensing lines RXL1 to RXL(n–1) in the third time interval. The touch driver 120 may apply the synchronization signal CDS to the n-th sensing electrode RXn through the n-th sensing line RXLn adjacent to the edge of the touch array 110 in the third time interval. As such, the touch driver 120 may output uplink signals ULS to the external device 300 by concurrently or substantially simultaneously applying the first to n–1-th touch driving signals STDS1 to STDS(n–1) and the synchronization signal CDS in the third time interval.

Referring to FIGS. 8 and 18, the touch driver 120 may concurrently or substantially simultaneously apply the first to n–1-th touch driving signals STDS1 to STDS(n–1) and the synchronization signal CDS to the touch electrodes of the second touch electrode group TXG2 in the fourth time interval after the third time interval.

For example, the touch driver 120 may apply the first to n–1-th touch driving signals STDS1 to STDS(n–1) to the second to n-th sensing electrodes RX2 to RXn, respectively. Concurrently or substantially simultaneously (e.g., at the same time), the touch driver 120 may apply the synchronization signal CDS to the first sensing electrode RX1 adjacent to the second sensing electrode RX2.

In more detail, the touch driver 120 may apply the first to n–1-th touch driving signals STDS1 to STDS(n–1) to the second to n-th sensing electrodes RX2 to RXn through the second to n-th sensing lines RXL2 to RXLn in the fourth time interval after the third time interval. The touch driver 120 may apply the synchronization signal CDS to the first sensing electrode RX1 adjacent to the edge of the touch array 110 through the first sensing line RXL1 in the fourth time interval. As such, the touch driver 120 may output uplink signals ULS to the external device 300 by concurrently or substantially simultaneously applying the first to n–1-th touch driving signals STDS1 to STDS(n–1) and the synchronization signal CDS in the fourth time interval after the third time interval.

When the touch driver 120 drives all channels concurrently or substantially simultaneously with each other, the synchronization signal may be alternately applied to the first sensing electrode RX1 and the n-th sensing electrode RXn adjacent to the edges of the touch array 110. Accordingly, the touch driving signals may be applied to all the touch electrodes of the second touch electrode group TXG2. Additionally, as the synchronization signal is alternately applied to the left and right sides of the touch array 110, the external device 300 may accurately receive the synchronization signal regardless of its position on the touch array 110, thereby improving touch accuracy.

The electronic or electric devices and/or any other relevant devices or components according to embodiments of the present disclosure described herein may be implemented utilizing any suitable hardware, firmware (e.g. an application-specific integrated circuit), software, or a combination of software, firmware, and hardware. For example, the various components of these devices may be formed on one integrated circuit (IC) chip or on separate IC chips. Further, the various components of these devices may be implemented on a flexible printed circuit film, a tape carrier package (TCP), a printed circuit board (PCB), or formed on one substrate. Further, the various components of these devices may be a process or thread, running on one or more processors, in one or more computing devices, executing computer program instructions and interacting with other system components for performing the various functionalities described herein. The computer program instructions are stored in a memory which may be implemented in a computing device using a standard memory device, such as, for example, a random access memory (RAM). The computer program instructions may also be stored in other non-transitory computer readable media such as, for example, a CD-ROM, flash drive, or the like. Also, a person of skill in the art should recognize that the functionality of various computing devices may be combined or integrated into a single computing device, or the functionality of a particular computing device may be distributed across one or more other computing devices without departing from the spirit and scope of the example embodiments of the present disclosure.

In accordance with embodiments of the present disclosure, a touch module capable of recognizing a touch with improved reliability, and an electronic device including the same may be provided.

However, the aspects and features in accordance with the embodiments of the present disclosure are not limited to those described above, and additional aspects and features may be apparent from the foregoing description, or may be learned by practicing one or more of the presented embodiments of the present disclosure.

The foregoing is illustrative of some embodiments of the present disclosure, and is not to be construed as limiting thereof. Although some embodiments have been described, those skilled in the art will readily appreciate that various modifications are possible in the embodiments without departing from the spirit and scope of the present disclosure. It will be understood that descriptions of features or aspects within each embodiment should typically be considered as available for other similar features or aspects in other embodiments, unless otherwise described. Thus, as would be apparent to one of ordinary skill in the art, features, characteristics, and/or elements described in connection with a particular embodiment may be used singly or in combination with features, characteristics, and/or elements described in connection with other embodiments unless otherwise specifically indicated. Therefore, it is to be understood that the foregoing is illustrative of various example embodiments and is not to be construed as limited to the specific embodiments disclosed herein, and that various modifications to the disclosed embodiments, as well as other example embodiments, are intended to be included within the spirit and scope of the present disclosure as defined in the appended claims, and their equivalents.

What is claimed is:

1. A touch module comprising:
   a touch array comprising:
      a first touch electrode group comprising touch electrodes extending in a first direction, and located along a second direction crossing the first direction; and
      a second touch electrode group comprising touch electrodes extending in the second direction, and located along the first direction; and
   a touch driver configured to output uplink signals through each of the first touch electrode group and the second touch electrode group to an external device adjacent to the touch array, the external device being configured to calculate position information based on the uplink signals,
   wherein the touch driver is configured to output the uplink signals by applying touch driving signals to some of the touch electrodes of the first touch electrode group, and by applying at least one synchronization signal to others of the touch electrodes of the first touch electrode group,
   wherein at least some of the touch driving signals are synchronized with the at least one synchronization signal,
   wherein the touch driving signals comprise first to m-th touch driving signals, and the at least one synchronization signal comprises a first synchronization signal,
   wherein the touch electrodes of the first touch electrode group comprise first to m+1-th touch electrodes sequentially located along the second direction,
   wherein the touch driver is configured to apply the first to m-th touch driving signals to the first to m-th touch electrodes from among the touch electrodes of the first touch electrode group, and apply the first synchronization signal to the m+1-th touch electrode,
   wherein m is an integer greater than 1,
   wherein the at least one synchronization signal further comprises a second synchronization signal,
   wherein the touch electrodes of the first touch electrode group further comprise a zeroth touch electrode adjacent to the first touch electrode in a direction opposite to the second direction, and
   wherein the touch driver is configured to apply the second synchronization signal to the zeroth touch electrode.

2. The touch module of claim 1, wherein the touch electrodes of the first touch electrode group are grouped into sub-touch electrode groups, and
   wherein the touch driver is configured to apply the touch driving signals and the at least one synchronization signal to each of the sub-touch electrode groups.

3. The touch module of claim 1, wherein the at least one synchronization signal comprises a pulse signal having a constant period.

4. The touch module of claim 1, wherein the touch driving signals comprise different codes from each other, and the codes are orthogonal to each other.

5. The touch module of claim 1, wherein the touch driver is configured to output the uplink signals by applying the touch driving signals to some of the touch electrodes of the second touch electrode group, and by applying the at least one synchronization signal to others of the touch electrodes of the second touch electrode group, and
   wherein at least some of the touch driving signals are synchronized with the at least one synchronization signal.

6. The touch module of claim 5, wherein the touch driver is configured to apply the touch driving signals to first touch electrodes from among the touch electrodes of the second touch electrode group, and apply the at least one synchronization signal to a second touch electrode adjacent to the first touch electrodes from among the touch electrodes of the second touch electrode group, and
   wherein the touch driver is configured to apply the touch driving signals and the at least one synchronization signal concurrently with each other.

7. The touch module of claim 5,
   wherein the touch driver is configured to apply the touch driving signals to first touch electrodes from among the touch electrodes of the second touch electrode group, and apply the first synchronization signal and the second synchronization signal to a second touch electrode and a third touch electrode adjacent to the first touch electrodes from among the touch electrodes of the second touch electrode group, and wherein the first touch electrodes are located between the second touch electrode and the third touch electrode.

8. The touch module of claim 5, wherein the touch electrodes of the second touch electrode group are grouped into sub-touch electrode groups, and wherein the touch driver is configured to apply the touch driving signals and the at least one synchronization signal to each of the sub-touch electrode groups.

9. A touch module comprising:

a touch array comprising:
 a first touch electrode group comprising touch electrodes extending in a first direction, and located along a second direction crossing the first direction; and
 a second touch electrode group comprising touch electrodes extending in the second direction, and located along the first direction; and a touch driver configured to output uplink signals through each of the first touch electrode group and the second touch electrode group to an external device adjacent to the touch array, the external device being configured to calculate position information based on the uplink signals, wherein the touch driver is configured to output the uplink signals by applying touch driving signals to some of the touch electrodes of the first touch electrode group, and by applying at least one synchronization signal to others of the touch electrodes of the first touch electrode group, wherein at least some of the touch driving signals are synchronized with the at least one synchronization signal, wherein the touch driver is configured to output the uplink signals by applying the touch driving signals to some of the touch electrodes of the second touch electrode group, and by applying the at least one synchronization signal to others of the touch electrodes of the second touch electrode group, wherein at least some of the touch driving signals are synchronized with the at least one synchronization signal, wherein the touch driving signals comprise first to n-th touch driving signals, wherein the touch electrodes of the second touch electrode group comprise first to n+1-th touch electrodes sequentially located along the first direction, wherein the touch driver is configured to apply the first to n-th touch driving signals to first to n-th touch electrodes from among the touch electrodes of the second touch electrode group, and apply the at least one synchronization signal to the n+1-th touch electrode, in a third time interval, and wherein n is an integer greater than 1.

10. The touch module of claim 9, wherein the touch driver is configured to apply the first to n-th touch driving signals to second to n+1-th touch electrodes from among the touch electrodes of the second touch electrode group, and apply the at least one synchronization signal to the first touch electrode, in a fourth time interval.

11. An electronic device comprising:

a touch array comprising:
 a first touch electrode group comprising touch electrodes extending in a first direction, and located along a second direction crossing the first direction; and
 a second touch electrode group comprising touch electrodes extending in the second direction, and located along the first direction;

a touch driver configured to output uplink signals through each of the first touch electrode group and the second touch electrode group; and a host configured to receive position information, which is calculated based on the uplink signals, from an external device adjacent to the touch array and configured to receive the uplink signals, wherein the touch driver is configured to output the uplink signals by applying touch driving signals to some of the touch electrodes of the first touch electrode group, and by applying at least one synchronization signal to others of the touch electrodes of the first touch electrode group, wherein at least some of the touch driving signals are synchronized with the at least one synchronization signal, wherein the touch driving signals comprise first to m-th touch driving signals, and the at least one synchronization signal comprises a first synchronization signal, wherein the touch electrodes of the first touch electrode group comprise first to m+1-th touch electrodes sequentially located along the second direction, wherein the touch driver is configured to apply the first to m-th touch driving signals to the first to m-th touch electrodes from among the touch electrodes of the first touch electrode group, and apply the first synchronization signal to the m+1-th touch electrode, wherein m is an integer greater than 1, wherein the at least one synchronization signal further comprises a second synchronization signal, wherein the touch electrodes of the first touch electrode group further comprise a zeroth touch electrode adjacent to the first touch electrode in a direction opposite to the second direction, and wherein the touch driver is configured to apply the second synchronization signal to the zeroth touch electrode.

* * * * *